US012651146B2

(12) United States Patent
Clark

(10) Patent No.: US 12,651,146 B2
(45) Date of Patent: Jun. 9, 2026

(54) SYSTEMS, METHODS, AND DEVICES FOR A PLATFORM FOR PREDICTING AND RANKING THE EFFICACY OF CATALYSTS AND SOLVENTS FOR CHEMICAL REACTIONS

(71) Applicant: Alex Michael Clark, Ottawa (CA)

(72) Inventor: Alex Michael Clark, Ottawa (CA)

( * ) Notice: Subject to any disclaimer, the term of this patent is extended or adjusted under 35 U.S.C. 154(b) by 643 days.

(21) Appl. No.: 18/121,200

(22) Filed: Mar. 14, 2023

(65) Prior Publication Data

US 2023/0289570 A1 Sep. 14, 2023

Related U.S. Application Data

(60) Provisional application No. 63/319,540, filed on Mar. 14, 2022.

(51) Int. Cl.
*G06N 3/0464* (2023.01)
*G06N 5/022* (2023.01)

(52) U.S. Cl.
CPC ........... *G06N 3/0464* (2023.01); *G06N 5/022* (2013.01)

(58) Field of Classification Search
CPC ..... G06N 20/00; G06N 13/0464; G06N 5/022
USPC .......................................................... 706/27
See application file for complete search history.

(56) References Cited

U.S. PATENT DOCUMENTS

2017/0198221 A1* 7/2017 Targett ................... C10B 53/02
2021/0125691 A1* 4/2021 Wlodarczyk-Pruszynski .............
G16C 20/10

OTHER PUBLICATIONS

Trevor David Rhone, Robert Hoyt, Christopher R. O'Connor, Matthew M. Montemore, Challa S.S.R. Kumar, Cynthia M. Friend, and Efthimios Kaxiras, Predicting outcomes of catalytic reactions using machine learning, 2019, 1908.10953v1, arXiv, Cornell University.
Teng Zhou, Kevin Mcbride, Steffen Linke, Zhen Song and Kai Sundmacher, Computer-aided solvent selection and design for efficient chemical processes, 2019, 27:35-44, Current Opinion in Chemical Engineering, Frontiers of chemical engineering, Elsevier.
Andrzej M. Zuranski, Jesus I. Martinez Alvarado, Benjamin J. Shields, and Abigail G. Doyle, Predicting Reaction Yields via Supervised Learning, 2021, 54, 8, 1856-1865, Accounts of Chemical Research, ACS Publications.

(Continued)

*Primary Examiner* — Hung T Vy
(74) *Attorney, Agent, or Firm* — HEER LAW; Christopher D. Heer

(57) ABSTRACT
Embodiments described herein provide a computer-implemented method for predicting reaction constituents, comprising: generating a catalyst or solvent efficacy score based on reaction data; storing a graph convolutional model, generated based on the reaction data and the catalyst/solvent efficacy scores: wherein for a catalyst, graph representations of the catalyst and of a reactant and a product are inputs to the graph convolutional model; and similarly for a solvent; predicting the effectiveness of a specified catalyst/solvent based on a specified reaction definition and/or predicting a catalyst/solvent by determining whether the first and second reactions have an identical core transform.

18 Claims, 36 Drawing Sheets

(56)                    References Cited

OTHER PUBLICATIONS

Eric Walker, Joshua Kammeraad, Jonathan Goetz, Michael T. Robo, Ambuj Tewari, and Paul M. Zimmerman, Learning to Predict Reaction Conditions: Relationships between Solvent, Molecular Structure, and Catalyst, 2019, 59, 3645-3654, Journal of Chemical Information and Modeling, ACS Publications.

Hanyu Gao, Thomas J. Struble, Connor W. Coley, Yuran Wang, William H. Green, and Klavs F. Jensen, Using Machine Learning to Predict Suitable Conditions for Organic Reactions, 2018, 4, 1465-1476, ACS Central Science, ACS Publications.

Nadine Schneider, Daniel M. Lowe, Roger A. Sayle, and Gregory A. Landrum, Development of a Novel Fingerprint for Chemical Reactions and Its Application to Large-Scale Reaction Classification and Similarity, 2015, 55, 39-53, Journal of Chemical Information and Modeling, ACS Publications.

Marwin H. S. Segler and Mark P. Waller, Neural-Symbolic Machine Learning for Retrosynthesis and Reaction Prediction, 2017, 23, 5966-5971, European Journal of Chemistry, Chemistry Europe.

Timur R. Gimadiev, Arkadii Lin, Valentina A. Afonina, Dinar Batyrshin, Ramil I. Nugmanov, Tagir Akhmetshin, Pavel Sidorov, Natalia Duybankova, Jonas Verhoeven, Joerg Wegner, Hugo Ceulemans, Andrey Gedich, Timur I. Madzhidov, and Alexandre Varnek, Reaction Data Curation I: Chemical Structures and Transformations Standardization, 2021, 40, 2100119, Molecular Informatics, Wiley.

Philipp Seidl, Philipp Renz, Natalia Dyubankova, Paulo Neves, Jonas Verhoeven, Jorg K. Wegner, Marwin Segler, Sepp Hochreiter, and Gunter Klambauer, Improving Few- and Zero-Shot Reaction Template Prediction Using Modern Hopfield Networks, 2022, 62 (9), 2111-2120, Journal of Chemical Information and Modeling, ACS Publications.

Mohammadamin Tavakoli, Aaron Mood, David Van Vranken, and Pierre Baldi, Quantum Mechanics and Machine Learning Synergies: Graph Attention Neural Networks to Predict Chemical Reactivity, 2022, 62 (9), 2121-2132, Journal of Chemical Information and Modeling, ACS Publications.

Steven M. Kearnes, Michael R. Maser, Michael Wleklinski, Anton Kast, Abigail G. Doyle, Spencer D. Dreher, Joel M. Hawkins, Klavs F. Jensen, and Connor W. Coley, The Open Reaction Database, 2021, 143, 18820-18826, Journal of the American Chemical Society, ACS Publications.

Connor W. Coley, Wengong Jin, Luke Rogers, Timothy F. Jamison, Tommi S. Jaakkola, William H. Green, Regina Barzilay and Klavs F. Jensen, A graph-convolutional neural network model for the prediction of chemical reactivity, 2019, 10, 370-377, Chemical Science, Royal Society of Chemistry.

Philippe Schwaller, Alain C Vaucher, Teodoro Laino and Jean-Louis Reymond, Prediction of chemical reaction yields using deep learning, 2021, 2, 015016, Machine Learning: Science and Technology, IOP Science.

David Peter Kovacs, William Mccorkindale and Alpha A. Lee, Quantitative interpretation explains machine learning models for chemical reaction prediction and uncovers bias, 2021, 12, 1695, Nature Communications, Nature.

William Bort, Igor I. Baskin, Timur Gimadiev, Artem Mukanov, Ramil Nugmanov, Pavel Sidorov, Gilles Marcou, Dragos Horvath, Olga Klimchuk, Timur Madzhidov & Alexandre Varnek, Discovery of novel chemical reactions by deep generative recurrent neural network, 2021, 11, 3178, Scientific Reports, Nature.

Masanori Kosugi, Yutaka Shimizu, and Toshihiko Migita, Alkylation, arylation, and vinylation of acyl chlorides by means of organotin compounds in the presence of catalytic amounts of tetrakis(triphenylphosphine) palladium(o),1977,1423-1424, Chemistry Letters, Chemical Society of Japan.

David A. Pensak and E. J. Corey, LHASA—Logic and Heuristics Applied to Synthetic Analysis, 1977, Computer-Assisted Organic Synthesis ACS Symposium Series; American Chemical Society, ACS Publications.

Anders Bogevig, Hans-Jurgen Federsel, Fernando Huerta, Michael G. Hutchings, Hans Kraut, Thomas Langer, Peter Low, Christoph Oppawsky, Tobias Rein, and Heinz Saller, Route Design in the 21st Century: The ICSYNTH Software Tool as an Idea Generator for Synthesis Prediction, 2015, 19, 2, 357-368, Organic Process Research & Development, American Chemical Society, ACS Publications.

"Deepmatter", Web page <https://www.deepmatter.io/>, 2 pages, retrieved on May 3, 2023.

"ChemPlanner 1.0, CHEManager", Web page <https://www.chemanager-online.com/en/products/research-laboratory/chemplanner-10>, 2 pages, retrieved on May 3, 2023.

"Reaxys Predictive Retrosynthesis", Web page <https://www.elsevier.com/solutions/reaxys/predictive-retrosynthesis>, 4 pages, retrieved on May 3, 2023.

"CAS, A division of the American Chemical Society", Web page <https://www.cas.org/>, 2 pages, retrieved on May 3, 2023.

"Reaxys", Web page <https://www.elsevier.com/solutions/reaxys>, 4 pages, retrieved on May 3, 2023.

SPRESIweb—chemical structure and reaction database by InfoChem, Web page <https://www.spresi.com/>, 1 page, retrieved on May 3, 2023.

Daniel Mark Lowe, Extraction of chemical structures and reactions from the literature, 2012, Department of Chemistry, Pembroke College, University of Cambridge.

"Molecular Materials Informatics", Web page <http://molecularnotebook.com/>, 3 pages, retrieved on May 3, 2023.

"GitHub, mmi formats", Web page<https://github.com/aclarkxyz/mmi_formats>,1 page, retrieved on May 3, 2023.

Alex M. Clark, Accurate Specification of Molecular Structures: The Case for Zero-Order Bonds and Explicit Hydrogen Counting, 2011, 51, 12, 3149-3157, Journal of Chemical Information and Modeling, American Chemical Society, ACS Publications, retrieved on Jun. 14, 2023.

"GitHub, data coordinchi", Web page <https://github.com/aclarkxyz/data_coordinchi>, 8 pages, retrieved on May 3, 2023.

Thomas N. Kipf, Max Welling, Semi-Supervised Classification with Graph Convolutional Networks, 2017, ICLR 2017, arXiv, Cornell University.

David Weininger, Smiles, A chemical language and information system. 1. Introduction to methodology and encoding rules, 1988, 28, 1, 31-36, Journal of Chemical Information and Computer Sciences, American Chemical Society, ACS Publications, retrieved on Jun. 14, 2023.

Coby J. Clarke, Wei-Chien Tu, Oliver Levers, Andreas Bröhl, and Jason P. Hallett, Green and Sustainable Solvents in Chemical Processes, 2018, 118, 2, 747-800, Chemical Reviews, American Chemical Society, ACS Publications, retrieved on Jun. 14, 2023.

"App Store, Molecular Notebook", Web page <https://apps.apple.com/us/app/molecular-notebook/id1006197668>, 2 pages, retrieved May 3, 2023.

"PerkinElmer, Informatics", Web page <https://perkinelmerinformatics.com/products/research/chemdraw>, 6 pages, retrieved on May 3, 2023.

* cited by examiner

|  | Catalysis | Solvents |
|---|---|---|
| Atom Feature Classes | Catalyst Graph: 53<br>Transform Graph: 40 | Solvent Graph: 12<br>Reagent Graph: 56<br>Transform Graph: 47 |
| Training Set Size | 3129 | 3152 |
| Testing Set Size | 347 | 350 |
| Average Score | 1.7801 (max 13.1678) | 1.6847 (max 7.1916) |
| Epochs | 12825 | 20698 |
| Training Average Error | 0.2368 ($R^2$ 0.9709) | 0.1310 ($R^2$ 0.9709) |
| Testing Average Error | 0.4108 ($R^2$ 0.9038) | 0.4435 ($R^2$ 0.5880) |

Figure 2B:
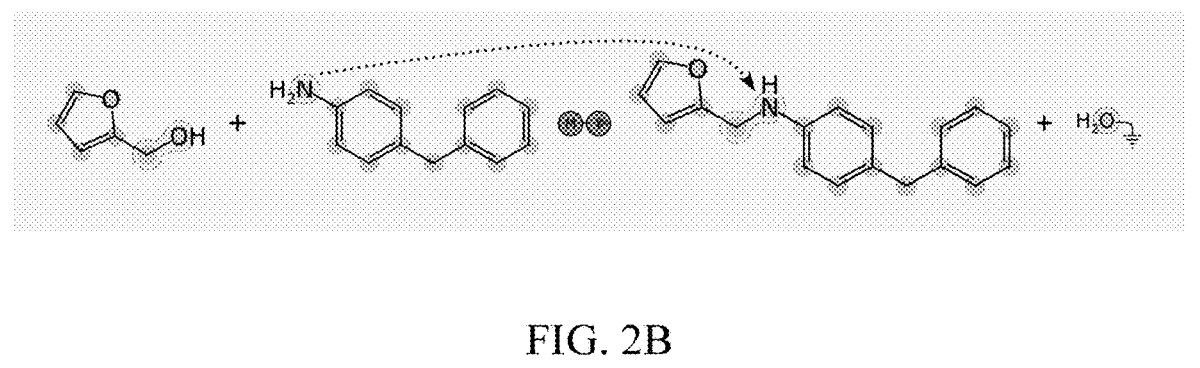

Figure 3:
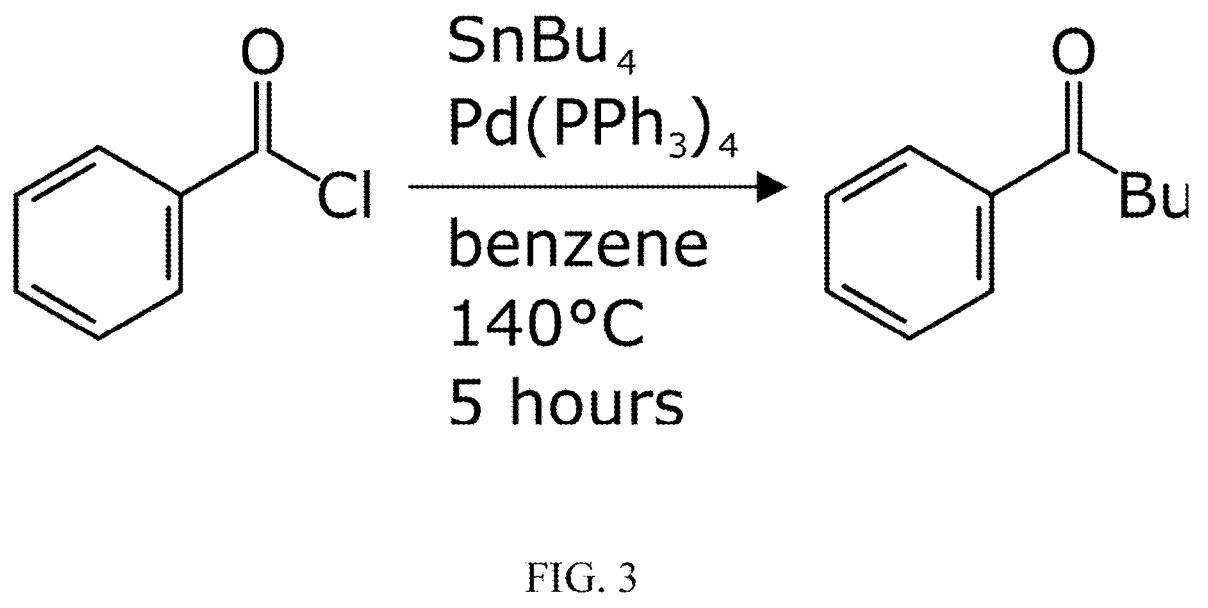

(c) CCOC(=O)c1=CC=C2c=CC3=C4C(=CC=C3)C=CC1=C24  +  CC(C)[Si](C#CBr)(C(C)C)C(C)C

CCOC(=O)c1=c(C=C2c=CC3=C4C(=CC=C3)C=CC1=C24)C#C[Si](C(C)C)(C(C)C)C(C)C

```
<DataSheet>
    <Summary>

<Title></Title>

<Description>

<![CDATA[]]>

</Description>
    </Summary>
    <Extension>
        <Ext
name="Reaction"
type="org.mmi.aspe
ct.Reaction">

<![CDATA[ nreactants=2 nproducts=3 nreagents=3
            ]]>
        </Ext>
        <Ext
name="Yield"
type="org.mmi.aspe
ct.Yield">

<![CDATA[]]>
        </Ext>
        <Ext
name="Experiment"
type="org.mmi.aspe
ct.Experiment">

<![CDATA[]]>
        </Ext>
    </Extension>
```

```
    <Header
nrows="1"
ncols="86">
        <Column
id="1"
name="ExperimentTi
tle"
type="string">Titl
e description for
the
experiment</Column
>
        <Column
id="2"
name="ExperimentCr
eateDate"
type="real">Date
the experiment was
created (seconds
since
1970)</Column>
        <Column
id="3"
name="ExperimentMo
difyDate"
type="real">Date
the experiment was
last modified
(seconds since
1970)</Column>
        <Column
id="4"
name="ExperimentDO
I"
type="string">Digi
tal object
identifiers (DOI)
for the experiment
(whitespace
separated)</Column
>
        <Column
id="5"
```

```
name="ExperimentMe
ta"
type="string">Addi
tional experiment
metadata</Column>
        <Column
id="6"
name="ExperimentSt
epMeta"
type="string">Addi
tional step
metadata</Column>
        <Column
id="7"
name="ReactantMol1
"
type="molecule">Mo
lecular structure
of
reactant</Column>
        <Column
id="8"
name="ReactantName
1"
type="string">Name
of
reactant</Column>
        <Column
id="9"
name="ReactantStoi
ch1"
type="string">Stoi
chiometry of
reactant</Column>
        <Column
id="10"
name="ReactantMass
1"
type="real">Mass
quantity of
reactant
(g)</Column>
```

FIG. 5A

```
        <Column
id="11"
name="ReactantVolu
me1"
type="real">Volume
quantity of
reactant
(mL)</Column>
        <Column
id="12"
name="ReactantMole
s1"
type="real">Molar
quantity of
reactant
(mol)</Column>
        <Column
id="13"
name="ReactantDens
ity1"
type="real">Densit
y of reactant
(g/mL)</Column>
        <Column
id="14"
name="ReactantConc
1"
type="real">Concen
tration of
reactant
(mol/L)</Column>
        <Column
id="15"
name="ReactantPrim
ary1"
type="boolean">Whe
ther the reactant
is used for yield
calculation</Colum
n>
        <Column
id="16"
name="ReactantMeta
```

```
1"
type="string">Addi
tional reactant
metadata</Column>
        <Column
id="17"
name="ProductMol1"
type="molecule">Mo
lecular structure
of
product</Column>
        <Column
id="18"
name="ProductName1
"
type="string">Name
of
product</Column>
        <Column
id="19"
name="ProductStoic
h1"
type="string">Stoi
chiometry of
product</Column>
        <Column
id="20"
name="ProductMass1
" type="real">Mass
quantity of
reactant
(g)</Column>
        <Column
id="21"
name="ProductVolum
e1"
type="real">Volume
quantity of
reactant
(mL)</Column>
        <Column
id="22"
name="ProductMoles
```

```
1"
type="real">Molar
quantity of
reactant
(mol)</Column>
        <Column
id="23"
name="ProductDensi
ty1"
type="real">Densit
y of reactant
(g/mL)</Column>
        <Column
id="24"
name="ProductConc1
"
type="real">Concen
tration of
reactant
(mol/L)</Column>
        <Column
id="25"
name="ProductYield
1"
type="real">Yield
of product
(%)</Column>
        <Column
id="26"
name="ProductWaste
1"
type="boolean">Whe
ther the product
is an unwanted
byproduct</Column>
        <Column
id="27"
name="ProductMeta1
"
type="string">Addi
tional product
metadata</Column>
```

FIG. 5B

```
        <Column
id="28"
name="ReactantMol2
"
type="molecule">Mo
lecular structure
of
reactant</Column>
        <Column
id="29"
name="ReactantName
2"
type="string">Name
of
reactant</Column>
        <Column
id="30"
name="ReactantStoi
ch2"
type="string">Stoi
chiometry of
reactant</Column>
        <Column
id="31"
name="ReactantMass
2"
type="real">Mass
quantity of
reactant
(g)</Column>
        <Column
id="32"
name="ReactantVolu
me2"
type="real">Volume
quantity of
reactant
(mL)</Column>
        <Column
id="33"
name="ReactantMole
s2"
type="real">Molar
```

```
quantity of
reactant
(mol)</Column>
        <Column
id="34"
name="ReactantDens
ity2"
type="real">Densit
y of reactant
(g/mL)</Column>
        <Column
id="35"
name="ReactantConc
2"
type="real">Concen
tration of
reactant
(mol/L)</Column>
        <Column
id="36"
name="ReactantPrim
ary2"
type="boolean">Whe
ther the reactant
is used for yield
calculation</Colum
n>
        <Column
id="37"
name="ReactantMeta
2"
type="string">Addi
tional reactant
metadata</Column>
        <Column
id="38"
name="ReagentMol1"
type="molecule">Mo
lecular structure
of
reagent</Column>
        <Column
id="39"
```

```
name="ReagentName1
"
type="string">Name
of
reagent</Column>
        <Column
id="40"
name="ReagentEquiv
1"
type="real">Molar
equivalents of
reagent</Column>
        <Column
id="41"
name="ReagentMass1
" type="real">Mass
quantity of
reagent
(g)</Column>
        <Column
id="42"
name="ReagentVolum
e1"
type="real">Volume
quantity of
reagent
(mL)</Column>
        <Column
id="43"
name="ReagentMoles
1"
type="real">Molar
quantity of
reagent
(mol)</Column>
        <Column
id="44"
name="ReagentDensi
ty1"
type="real">Densit
y of reagent
(g/mL)</Column>
```

FIG. 5C

```
        <Column
id="45"
name="ReagentConc1
"
type="real">Concen
tration of reagent
(mol/L)</Column>
        <Column
id="46"
name="ReagentMeta1
"
type="string">Addi
tional reagent
metadata</Column>
        <Column
id="47"
name="ReagentMol2"
type="molecule">Mo
lecular structure
of
reagent</Column>
        <Column
id="48"
name="ReagentName2
"
type="string">Name
of
reagent</Column>
        <Column
id="49"
name="ReagentEquiv
2"
type="real">Molar
equivalents of
reagent</Column>
        <Column
id="50"
name="ReagentMass2
" type="real">Mass
quantity of
reagent
(g)</Column>
```

```
        <Column
id="51"
name="ReagentVolum
e2"
type="real">Volume
quantity of
reagent
(mL)</Column>
        <Column
id="52"
name="ReagentMoles
2"
type="real">Molar
quantity of
reagent
(mol)</Column>
        <Column
id="53"
name="ReagentDensi
ty2"
type="real">Densit
y of reagent
(g/mL)</Column>
        <Column
id="54"
name="ReagentConc2
"
type="real">Concen
tration of reagent
(mol/L)</Column>
        <Column
id="55"
name="ReagentMeta2
"
type="string">Addi
tional reagent
metadata</Column>
        <Column
id="56"
name="ReagentMol3"
type="molecule">Mo
lecular structure
```

```
of
reagent</Column>
        <Column
id="57"
name="ReagentName3
"
type="string">Name
of
reagent</Column>
        <Column
id="58"
name="ReagentEquiv
3"
type="real">Molar
equivalents of
reagent</Column>
        <Column
id="59"
name="ReagentMass3
" type="real">Mass
quantity of
reagent
(g)</Column>
        <Column
id="60"
name="ReagentVolum
e3"
type="real">Volume
quantity of
reagent
(mL)</Column>
        <Column
id="61"
name="ReagentMoles
3"
type="real">Molar
quantity of
reagent
(mol)</Column>
        <Column
id="62"
name="ReagentDensi
ty3"
```

FIG. 5D

```
type="real">Densit
y of reagent
(g/mL)</Column>
        <Column
id="63"
name="ReagentConc3
"
type="real">Concen
tration of reagent
(mol/L)</Column>
        <Column
id="64"
name="ReagentMeta3
"
type="string">Addi
tional reagent
metadata</Column>
        <Column
id="65"
name="ProductMol2"
type="molecule">Mo
lecular structure
of
product</Column>
        <Column
id="66"
name="ProductName2
"
type="string">Name
of
product</Column>
        <Column
id="67"
name="ProductStoic
h2"
type="string">Stoi
chiometry of
product</Column>
        <Column
id="68"
name="ProductMass2
" type="real">Mass
quantity of
```

```
reactant
(g)</Column>
        <Column
id="69"
name="ProductVolum
e2"
type="real">Volume
quantity of
reactant
(mL)</Column>
        <Column
id="70"
name="ProductMoles
2"
type="real">Molar
quantity of
reactant
(mol)</Column>
        <Column
id="71"
name="ProductDensi
ty2"
type="real">Densit
y of reactant
(g/mL)</Column>
        <Column
id="72"
name="ProductConc2
"
type="real">Concen
tration of
reactant
(mol/L)</Column>
        <Column
id="73"
name="ProductYield
2"
type="real">Yield
of product
(%)</Column>
        <Column
id="74"
name="ProductWaste
```

```
2"
type="boolean">Whe
ther the product
is an unwanted
byproduct</Column>
        <Column
id="75"
name="ProductMeta2
"
type="string">Addi
tional product
metadata</Column>
        <Column
id="76"
name="ProductMol3"
type="molecule">Mo
lecular structure
of
product</Column>
        <Column
id="77"
name="ProductName3
"
type="string">Name
of
product</Column>
        <Column
id="78"
name="ProductStoic
h3"
type="string">Stoi
chiometry of
product</Column>
        <Column
id="79"
name="ProductMass3
" type="real">Mass
quantity of
reactant
(g)</Column>
        <Column
id="80"
name="ProductVolum
```

FIG. 5E e3"
type="real">Volume
quantity of
reactant
(mL)</Column>
        <Column
id="81"
name="ProductMoles
3"
type="real">Molar
quantity of
reactant
(mol)</Column>
        <Column
id="82"
name="ProductDensi
ty3"
type="real">Densit
y of reactant
(g/mL)</Column>
        <Column
id="83"
name="ProductConc3
"
type="real">Concen
tration of
reactant
(mol/L)</Column>
        <Column
id="84"
name="ProductYield
3"
type="real">Yield
of product
(%)</Column>
        <Column
id="85"
name="ProductWaste
3"
type="boolean">Whe
ther the product
is an unwanted
byproduct</Column>

<Column
id="86"
name="ProductMeta3
"
type="string">Addi
tional product
metadata</Column>
    </Header>
    <Content>
        <Row
id="1">
            <Cell
id="1">

<![CDATA[]]>

</Cell>
            <Cell
id="2">1640803289.
852</Cell>
            <Cell
id="3">1640810594.
167</Cell>
            <Cell
id="4">

<![CDATA[10.1021-
acscatal.7b04395]]
>

</Cell>
            <Cell
id="5">

<![CDATA[]]>

</Cell>
            <Cell
id="6">

<![CDATA[ time=48 heat=45

]]>

</Cell>
            <Cell
id="7">

<![CDATA[
SketchEl!(21,24)
C=-
2.9500,5.6500;0,0,
i0,n9
C=-
4.2490,4.9000;0,0,
i0,n10
C=-
4.2490,3.4000;0,0,
i0,n11
C=-
2.9500,2.6500;0,0,
i1,n12
C=-
1.6510,3.4000;0,0,
i1,n8
C=-
1.6510,4.9000;0,0,
i0,n6
C=-
0.3519,5.6500;0,0,
i0,n5
O=0.9471,4.9000;0,
0,i0,n4
O=-
0.3519,7.1500;0,0,
i0,n7
C=2.2462,5.6500;0,
0,i2,n3
C=3.5452,4.9000;0,
0,i3,n24

FIG. 5F

```
C=-
5.5480,5.6500;0,0,
i0,n1
C=-
6.8471,4.9000;0,0,
i0,n26
C=-
6.8471,3.4000;0,0,
i1,n27
C=-
5.5480,2.6500;0,0,
i1,n25
C=-
2.9500,7.1500;0,0,
i1,n28
C=-
4.2490,7.9000;0,0,
i1,n31
C=-
5.5480,7.1500;0,0,
i0,n29
C=-
6.8471,7.9000;0,0,
i1,n32
C=-
8.1461,7.1499;0,0,
i1,n33
C=-
8.1461,5.6499;0,0,
i1,n30
1-2=2,0
2-3=1,0
3-4=2,0
4-5=1,0
5-6=2,0
6-1=1,0
6-7=1,0
7-8=1,0
7-9=2,0
8-10=1,0
10-11=1,0
2-12=1,0
12-13=2,0
13-14=1,0
14-15=2,0
15-3=1,0
1-16=1,0
16-17=2,0
17-18=1,0
18-12=1,0
18-19=2,0
19-20=1,0
20-21=2,0
21-13=1,0
!End

]]>

</Cell>
            <Cell
id="8">

<![CDATA[]]>

</Cell>
            <Cell
id="9">

<![CDATA[]]>

</Cell>
            <Cell
id="10"/>
            <Cell
id="11"/>
            <Cell
id="12"/>
            <Cell
id="13"/>
            <Cell
id="14"/>
            <Cell
id="15">false</Cel
l>
            <Cell
id="16">
<![CDATA[]]>

</Cell>
            <Cell
id="17">

<![CDATA[
SketchEl!(27,30)
C=-
2.9500,5.6500;0,0,
i0,n9
C=-
4.2490,4.9000;0,0,
i0,n10
C=-
4.2490,3.4000;0,0,
i0,n11
C=-
2.9500,2.6500;0,0,
i1,n12
C=-
1.6510,3.4000;0,0,
i0,n8
C=-
1.6510,4.9000;0,0,
i0,n6
C=-
0.3519,5.6500;0,0,
i0,n5
O=0.9471,4.9000;0,
0,i0,n4
O=-
0.3519,7.1500;0,0,
i0,n7
C=2.2462,5.6500;0,
0,i2,n3
C=-
0.3520,2.6500;0,0,
i0,n14
C=0.9471,1.9000;0,
0,i0,n13
```

FIG. 5G

Si=2.2461,1.1500;0
,0,i0,n2
{^i}Pr=3.5452,0.40
01;0,0,i0,n15,aSke
tchEl!(4\002C3)\00
0A*\003D-
6.4450\002C2.0214\
003B0\002C0\002Ci0
\000AC\003D-
4.1950\002C3.3204\
003B0\002C0\002Ci3
\000AC\003D-
4.1950\002C0.7224\
003B0\002C0\002Ci3
\000AC\003D-
4.9450\002C2.0214\
003B0\002C0\002Ci1
\000A4-
2\003D1\002C0\000A
4-
3\003D1\002C0\000A
4-
1\003D1\002C0\000A
!End\000A
{^i}Pr=1.4962,-
0.1490;0,0,i0,n16,
aSketchEl!(4\002C3
)\000A*\003D-
6.4450\002C2.0214\
003B0\002C0\002Ci0
\000AC\003D-
4.1950\002C3.3204\
003B0\002C0\002Ci3
\000AC\003D-
4.1950\002C0.7224\
003B0\002C0\002Ci3
\000AC\003D-
4.9450\002C2.0214\
003B0\002C0\002Ci1
\000A4-
2\003D1\002C0\000A
4-
3\003D1\002C0\000A 4-
1\003D1\002C0\000A
!End\000A
{^i}Pr=2.9961,2.44
91;0,0,i0,n17,aSke
tchEl!(4\002C3)\00
0A*\003D-
6.4450\002C2.0214\
003B0\002C0\002Ci0
\000AC\003D-
4.1950\002C3.3204\
003B0\002C0\002Ci3
\000AC\003D-
4.1950\002C0.7224\
003B0\002C0\002Ci3
\000AC\003D-
4.9450\002C2.0214\
003B0\002C0\002Ci1
\000A4-
2\003D1\002C0\000A
4-
3\003D1\002C0\000A
4-
1\003D1\002C0\000A
!End\000A
C=3.5452,4.9000;0,
0,i3,n24
C=-
5.5480,5.6500;0,0,
i0,n1
C=-
6.8471,4.9000;0,0,
i0,n26
C=-
6.8471,3.4000;0,0,
i1,n27
C=-
5.5480,2.6500;0,0,
i1,n25
C=-
2.9500,7.1500;0,0,
i1,n28

```
26-27=2,0
27-19=1,0
!End

]]>

</Cell>
        <Cell
id="18">

<![CDATA[]]>

</Cell>
        <Cell
id="19">

<![CDATA[]]>

</Cell>
        <Cell
id="20"/>
        <Cell
id="21"/>
        <Cell
id="22"/>
        <Cell
id="23"/>
        <Cell
id="24"/>
        <Cell
id="25">84</Cell>
        <Cell
id="26">false</Cel
l>
        <Cell
id="27">

<![CDATA[]]>

</Cell>
        <Cell
id="28">
```
```
<![CDATA[
SketchEl!(7,6)
Br=-
2.1902,1.8632;0,0,
i0,n20
C=-
0.6902,1.8632;0,0,
i0,n14
C=0.8099,1.8632;0,
0,i0,n13
Si=2.3098,1.8632;0
,0,i0,n2
{^i}Pr=3.8098,1.86
33;0,0,i0,n15,aSke
tchEl!(4\002C3)\00
0A*\003D-
6.4450\002C2.0214\
003B0\002C0\002Ci0
\000AC\003D-
4.1950\002C3.3204\
003B0\002C0\002Ci3
\000AC\003D-
4.1950\002C0.7224\
003B0\002C0\002Ci3
\000AC\003D-
4.9450\002C2.0214\
003B0\002C0\002Ci1
\000A4-
2\003D1\002C0\000A
4-
3\003D1\002C0\000A
4-
1\003D1\002C0\000A
!End\000A
{^i}Pr=2.3099,0.36
33;0,0,i0,n16,aSke
tchEl!(4\002C3)\00
0A*\003D-
6.4450\002C2.0214\
003B0\002C0\002Ci0
\000AC\003D-
4.1950\002C3.3204\
```
```
003B0\002C0\002Ci3
\000AC\003D-
4.1950\002C0.7224\
003B0\002C0\002Ci3
\000AC\003D-
4.9450\002C2.0214\
003B0\002C0\002Ci1
\000A4-
2\003D1\002C0\000A
4-
3\003D1\002C0\000A
4-
1\003D1\002C0\000A
!End\000A
{^i}Pr=2.3098,3.36
33;0,0,i0,n17,aSke
tchEl!(4\002C3)\00
0A*\003D-
6.4450\002C2.0214\
003B0\002C0\002Ci0
\000AC\003D-
4.1950\002C3.3204\
003B0\002C0\002Ci3
\000AC\003D-
4.1950\002C0.7224\
003B0\002C0\002Ci3
\000AC\003D-
4.9450\002C2.0214\
003B0\002C0\002Ci1
\000A4-
2\003D1\002C0\000A
4-
3\003D1\002C0\000A
4-
1\003D1\002C0\000A
!End\000A
1-2=1,0
2-3=3,0
3-4=1,0
4-5=1,0
4-6=1,0
4-7=1,0
!End
```

</Cell>
        <Cell
id="29">

<![CDATA[]]>

</Cell>
        <Cell
id="30">

<![CDATA[]]>

</Cell>
        <Cell
id="31"/>
        <Cell
id="32"/>
        <Cell
id="33"/>
        <Cell
id="34"/>
        <Cell
id="35"/>
        <Cell
id="36">false</Cel
l>
        <Cell
id="37">

<![CDATA[]]>

</Cell>
        <Cell
id="38">

<![CDATA[
SketchEl!(26,36)
Cl=2.5558,4.4736;0
,0,i0
```

```
Rh=1.1440,3.0618;0
,0,i0,xARENE:2:1
Cl=2.5558,1.6501;0
,0,i0
Rh=3.9675,3.0618;0
,0,i0,xARENE:1:1
C=6.4940,1.5853;0,
0,i0,xARENE:1:2
C=4.8292,1.3690;0,
0,i0,xARENE:1:4
C=5.3847,0.4927;0,
0,i0,xARENE:1:3
C=6.9541,3.0729;0,
0,i0,xARENE:1:6
C=5.9205,3.1631;0,
0,i0,xARENE:1:5
C=7.2174,1.1452;0,
0,i3
C=7.9398,4.2035;0,
0,i3
C=5.9469,4.6628;0,
0,i3
C=3.5259,0.6263;0,
0,i3
C=4.8342,-
0.9027;0,0,i3
C=-
1.3825,4.5384;0,0,
i0,xARENE:2:2
C=0.2823,4.7547;0,
0,i0,xARENE:2:4
C=-
0.2731,5.6310;0,0,
i0,xARENE:2:3
C=-
1.8425,3.0508;0,0,
i0,xARENE:2:6
C=-
0.8090,2.9606;0,0,
i0,xARENE:2:5
C=-
2.1059,4.9784;0,0,
i3
```

```
15-20=1,0
18-21=1,0
19-22=1,0
16-23=1,0
17-24=1,0
2-25=1,0
4-26=1,0
!End

]]>

</Cell>
          <Cell
id="39">

<![CDATA[[Rh(Cp*)C
l2]2]]>

</Cell>
          <Cell
id="40">0.025</Cel
l>
          <Cell
id="41"/>
          <Cell
id="42"/>
          <Cell
id="43"/>
          <Cell
id="44"/>
          <Cell
id="45"/>
          <Cell
id="46">

<![CDATA[]]>

</Cell>
          <Cell
id="47">

<![CDATA[
SketchEl!(5,3)
```

```
C=0.5143,0.5143;0,
0,i0,n21
C=-0.7848,-
0.2357;0,0,i3,n18
O=1.8133,-0.2357;-
1,0,i0,n22
O=0.5143,2.0143;0,
0,i0,n23
Li=3.1123,0.5143;1
,0,i0,n19
1-2=1,0
1-3=1,0
1-4=2,0
!End

]]>

</Cell>
          <Cell
id="48">

<![CDATA[lithium
acetate]]>

</Cell>
          <Cell
id="49">1.2</Cell>
          <Cell
id="50"/>
          <Cell
id="51"/>
          <Cell
id="52"/>
          <Cell
id="53"/>
          <Cell
id="54"/>
          <Cell
id="55">

<![CDATA[]]>

</Cell>
```

```
          <Cell
id="56">

<![CDATA[
SketchEl!(4,3)
C=-
0.2571,0.8286;0,0,
i2
C=1.0419,1.5786;0,
0,i2
Cl=2.3409,0.8286;0
,0,i0
Cl=-
1.5562,1.5786;0,0,
i0
1-2=1,0
2-3=1,0
1-4=1,0
!End

]]>

</Cell>
          <Cell
id="57">

<![CDATA[1,2-
dichloroethane]]>

</Cell>
          <Cell
id="58"/>
          <Cell
id="59"/>
          <Cell
id="60"/>
          <Cell
id="61"/>
          <Cell
id="62">1.256</Cel
l>
          <Cell
id="63"/>
```

FIG. 5K

```
          <Cell                      </Cell>                            <Cell
id="64">                                      <Cell       id="77">
                            id="68"/>
<![CDATA[]]>                                  <Cell       <![CDATA[]]>
                            id="69"/>
</Cell>                                       <Cell       </Cell>
          <Cell             id="70"/>                            <Cell
id="65">                                      <Cell       id="78">
                            id="71"/>
<![CDATA[                                     <Cell       <![CDATA[]]>
SketchEl!(4,3)            id="72"/>
C=0.5143,0.5143;0,                            <Cell       </Cell>
0,i0,n21                  id="73"/>                            <Cell
C=-0.7848,-                                   <Cell       id="79"/>
0.2357;0,0,i3,n18         id="74">true</Cell            <Cell
O=1.8133,-                >                             id="80"/>
0.2357;0,0,i1,n22                             <Cell            <Cell
O=0.5143,2.0143;0,        id="75">            id="81"/>
0,i0,n23                                                       <Cell
1-2=1,0                   <![CDATA[]]>        id="82"/>
1-3=1,0                                                        <Cell
1-4=2,0                   </Cell>            id="83"/>
!End                                  <Cell                  <Cell
                          id="76">            id="84"/>
]]>                                                           <Cell
                          <![CDATA[          id="85">true</Cell
</Cell>                   SketchEl!(2,0)      >
          <Cell            Li=0.0000,0.0000;1                  <Cell
id="66">                  ,0,i0,n19           id="86">
                          Br=1.5000,0.0000;-
<![CDATA[]]>              1,0,i0,n20          <![CDATA[]]>
                          !End
</Cell>                                       </Cell>
          <Cell            ]]>                        </Row>
id="67">                                         </Content>
                          </Cell>            </DataSheet>
<![CDATA[]]>
```

```java
void deduplicateMappings(Molecule sideA, Molecule sideB)
{
    // validity criteria check
    int na = sideA.numAtoms();
    if (na != sideB.numAtoms())
        throw new GraphFaultException("Atom counts are unequal");
    Map<Integer, Integer> freqA = new HashMap<>(), freqB = new HashMap<>();
    int highMap = 0;
    for (int n = 1; n <= na; n++)
    {
        int m1 = sideA.atomMapNum(n), m2 = sideB.atomMapNum(n);
        freqA.put(m1, freqA.getOrDefault(m1, 0) + 1);
        freqB.put(m2, freqB.getOrDefault(m2, 0) + 1);
        highMap = Math.max(highMap, Math.max(m1, m2));
    }
    for (int map : freqA.keySet()) if (freqA.get(map) != freqB.get(map))
        throw new GraphFaultException("Atom mapping frequencies do not match");
    for (int map : freqB.keySet()) if (freqA.get(map) != freqB.get(map))
        throw new GraphFaultException("Atom mapping frequencies do not match");

Graph graphA = new Graph(sideA), graphB = new Graph(sideB);

// iteratively reduce until nothing left todo
    while (true)
    {
        Map<Integer, Integer> freq = new TreeMap<>(); // total for both sides
        for (int n = 1; n <= na; n++)
        {
            int m1 = sideA.atomMapNum(n), m2 = sideB.atomMapNum(n);
            freq.put(m1, freq.getOrDefault(m1, 0) + 1);
            freq.put(m2, freq.getOrDefault(m2, 0) + 1);
        }
        int degenFreq = Vec.max(Vec.primInt(freq.values()));
        if (degenFreq == 2) break; // nothing left but pairs int bestA1 = 0, bestA2 = 0, bestScore = Integer.MAX_VALUE;

for (var entry : freq.entrySet()) if (entry.getValue() == degenFreq)
        {
            int map = entry.getKey();
            int[] atoms1 = null, atoms2 = null;
            for (int n = 1; n <= na; n++)
```

FIG. 7A

```
{
    if (sideA.atomMapNum(n) == map) atoms1 = Vec.append(atoms1, n);
    if (sideB.atomMapNum(n) == map) atoms2 = Vec.append(atoms2, n);
}
for (int a1 : atoms1)
{
    int[] bfs1 = graphA.calculateBFS(a1 - 1);
    for (int a2 : atoms2)
    {
        int[] bfs2 = graphB.calculateBFS(a2 - 1);

int score = Integer.MAX_VALUE - 1;

for (var entUniq : freq.entrySet()) if (entUniq.getValue() == 2)
        {
            int mapUniq = entUniq.getKey();
            int dist1 = 0, dist2 = 0;
            for (int n = 1; n <= na; n++)
            {
                if (sideA.atomMapNum(n) == mapUniq) dist1 = bfs1[n - 1];
                if (sideB.atomMapNum(n) == mapUniq) dist2 = bfs2[n - 1];
            }
            if (dist1 > 0 && dist2 > 0) score = dist1 + dist2;
        } if (score < bestScore)
        {
            bestA1 = a1;
            bestA2 = a2;
            bestScore = score;
        }
    }
} highMap++;
sideA.setAtomMapNum(bestA1, highMap);
sideB.setAtomMapNum(bestA2, highMap);
    }
}
```

(a)  catalyst training network
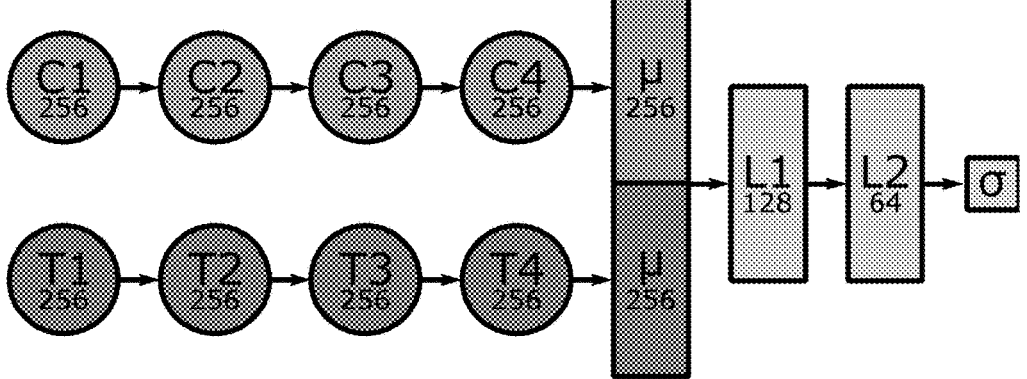
(b)  solvent training network
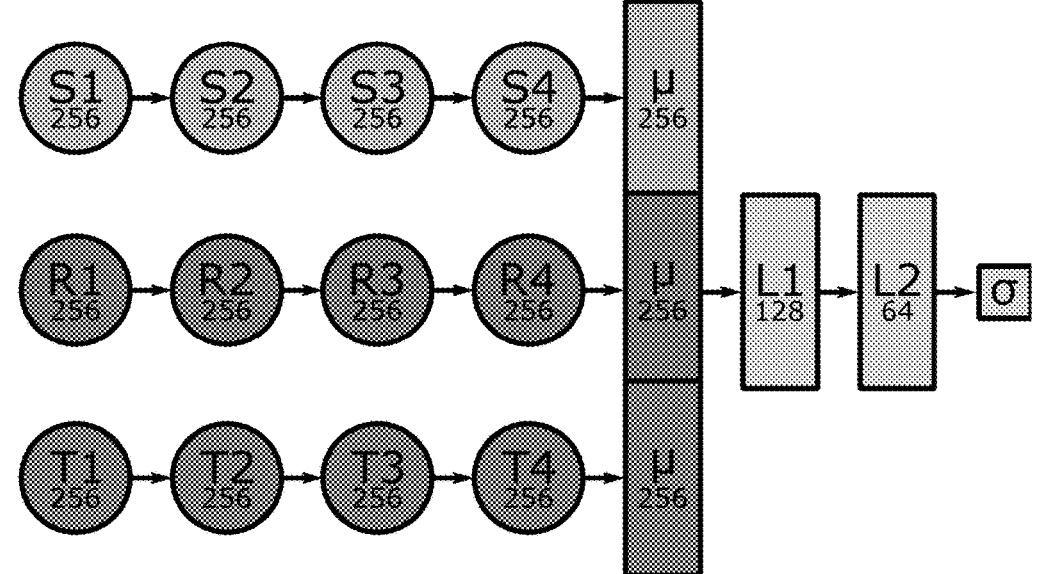
FIG. 12

```python
class GraphLayer(nn.Module):
    """
    A simple GCN layer, similar to https://arxiv.org/abs/1609.02907
    """
    def __init__(self, in_features, out_features, bias=True):
        super().__init__()
        self.linear = nn.Linear(in_features, out_features, bias=bias)

def forward(self, X, A, B):
        x = self.linear(X)
        z = torch.zeros(x.shape).to(X.get_device())
        sz = len(x)
        I = torch.arange(sz).to(X.get_device())
        a = torch.cat((A, B, I), 0)
        b = torch.cat((B, A, I), 0)
        inv = 1.0 / a.bincount(minlength=sz).float().sqrt()
        inv = inv.reshape(sz, 1)
        return z.index_add(0, a, x[b] * inv[a] * inv[b])

class CatalystNetwork(nn.Module):
    def __init__(self, catsz, tfmsz):
        super(CatalystNetwork, self).__init__()

hdim = 256
        ldim1 = 128
        ldim2 = 64 self.catconv1 = GraphLayer(catsz, hdim)
        self.catconv2 = GraphLayer(hdim, hdim)
        self.catconv3 = GraphLayer(hdim, hdim)
        self.catconv4 = GraphLayer(hdim, hdim)

self.tfmconv1 = GraphLayer(tfmsz, hdim)
        self.tfmconv2 = GraphLayer(hdim, hdim)
        self.tfmconv3 = GraphLayer(hdim, hdim)
        self.tfmconv4 = GraphLayer(hdim, hdim)

self.linear1 = nn.Linear(2 * hdim, ldim1)
        self.linear2 = nn.Linear(ldim1, ldim2)
        self.fc = nn.Linear(ldim2, 1)

self.drop = nn.Dropout(p=0.2)
```

FIG. 13A

```python
def forward(self, cblk, cx, ce1, ce2, tblk, tx, te1, te2):
    cx = F.selu(self.catconv1(cx, ce1, ce2))
    cx = F.selu(self.catconv2(cx, ce1, ce2))
    cx = F.selu(self.catconv3(cx, ce1, ce2))
    cx = F.selu(self.catconv4(cx, ce1, ce2))

tx = F.selu(self.tfmconv1(tx, te1, te2))
    tx = F.selu(self.tfmconv2(tx, te1, te2))
    tx = F.selu(self.tfmconv3(tx, te1, te2))
    tx = F.selu(self.tfmconv4(tx, te1, te2))

cx = torch.stack([g.mean(dim=0) for g in cx.split(cblk)])
    tx = torch.stack([g.mean(dim=0) for g in tx.split(tblk)])

x = torch.cat((cx, tx), 1)
    x = F.selu(self.linear1(x))
    x = self.drop(x)
    x = F.selu(self.linear2(x))
    x = self.drop(x)

return self.fc(x)

def loss_function(output, target):
    return ((output - target) ** 2).sum().sum()
```

SYSTEMS, METHODS, AND DEVICES FOR A PLATFORM FOR PREDICTING AND RANKING THE EFFICACY OF CATALYSTS AND SOLVENTS FOR CHEMICAL REACTIONS

FIELD

The present specification relates generally to artificial intelligence, and specifically to platforms for machine learning in chemistry.

BACKGROUND

A common chemical reaction can be defined as an experimental procedure where one-or-more molecular species are treated under a set of conditions such that at least one of the inputs is transformed into a different molecular species. A representative example of a simple reaction is shown in FIG. 3.

Depiction of chemical reactions is layered atop drawing conventions for molecules that have evolved over many decades, with many publications in the mid-19th century being quite recognizable by modern standards. Drawing conventions for a single step reaction can involve an arrow that separates the reactants (left hand side) and products (right hand side). There is often just one primary reactant of interest and just one desired product, but there are numerous variations and a significant range in complexity.

Primary reactants and products are typically drawn as molecular sketches, which are rapidly recognizable to the trained eye of a professional chemist, and usually impart a very complete description of the molecular structure. There are, however, a number of peculiarities and shortcuts which can cause problems for computer interpretation.

Most reactions contain several other molecular species that participate in the reaction, which are often written above or below the arrow, using a condensed shorthand notation. These commonly include reagents (which contribute atoms to the final product but are considered too generic to be worth sketching out in full); catalysts, which facilitate the reaction but are not incorporated into the product; and solvents, which provide the matrix for the reaction to take place. Furthermore, the space above/below the reaction arrow is often used to concisely summarize the reaction conditions, such as specifying the duration, temperature, other inputs such as photochemistry or purification steps.

SUMMARY

In accordance with an aspect, there is provided a computer-implemented system for predicting reaction constituents, the system comprising: a reaction data generator configured to store reaction data for at least one reaction; a drawing generator configured to generate data representing a drawing of the at least one reaction based on the reaction data; a scoring engine configured to generate a catalyst efficacy score, a solvent efficacy score, or both based on the reaction data; a storage unit defining a graph convolutional model having at least one multilayer fully connected neural network, generated based on the reaction data and at least one of the catalyst efficacy score or the solvent efficacy score; wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and one or more reagents are inputs to the graph convolutional model; and a prediction engine configured to predict at least one catalyst or at least one solvent from a first reaction for a second reaction based on the reaction data by determining whether the first reaction and the second reaction have an identical core transform.

In some embodiments, the reaction data generator is configured to classify at least one constituent as a reactant, reagent, product, by-product, catalyst, solvent, or unknown.

In some embodiments, the reaction data generator is configured to convert multistep reaction data to data representing two or more single step reactions.

In some embodiments, the drawing generator is configured to generate the drawing of the reaction by assigning unique mapping numbers to each atom pair, each atom pair comprising a first atom on a first side of the reaction and a second atom on a second side of the reaction.

In some embodiments, the system further comprises a mapping number generator configured to remove degeneracy in reaction data for the at least one reaction.

In some embodiments, the catalyst efficacy score is log (1+raw catalyst score), wherein $$\text{catalyst raw score} = \frac{Y \cdot e^{-T}}{t \cdot M}$$

where Y is percentage yield (multiplied by 0.01), T is temperature in ° C. (multiplied by 0.01), t is time (in hours) and M is molar fraction of catalyst (as a fraction of 1 equivalent of the limiting reactant).

In some embodiments, the solvent efficacy score is log (1+raw solvent score), wherein $$\text{raw solvent score} = \frac{Y \cdot e^{-T}}{t}.$$

In some embodiments, the system further includes a model generator configured to generate a training set for the graph convolutional model, the training set including: for the catalyst, a transform graph, a catalyst graph, and a catalyst efficacy score; and for the solvent, a transform graph, a reagents graph, a solvent graph, and a solvent efficacy score.

In some embodiments, the prediction engine is configured to rank each of the catalysts or each of the solvents or both based on a corresponding efficacy score.

In some embodiments, the system further includes an interactive user interface device.

In accordance with an aspect, there is provided a computer-implemented method for predicting reaction constituents, the method including: generating reaction data for at least one reaction; generating data representing a drawing of the at least one reaction based on the reaction data; generating a catalyst efficacy score, a solvent efficacy score, or both based on the reaction data; storing a graph convolutional model having at least one multilayer fully connected neural network, generated based on the reaction data and at least one of the catalyst efficacy score or the solvent efficacy score; wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and one or more reagents are inputs to the graph convolutional model; and predicting, from a first reaction, at least one catalyst or at least one solvent for a second reaction based on the reaction data by determining whether the first reaction and the second reaction have an identical core transform.

In some embodiments, the method further includes classifying at least one constituent as a reactant, reagent, product, by-product, catalyst, solvent, or unknown.

In some embodiments, the method further includes converting multistep reaction data to data representing two or more single step reactions.

In some embodiments, the method further includes generating the drawing of the reaction by assigning unique mapping numbers to each atom pair, each atom pair comprising a first atom on a first side of the reaction and a second atom on a second side of the reaction.

In some embodiments, the method further includes removing degeneracy in reaction data for the at least one reaction.

In some embodiments, the catalyst efficacy score is log (1+raw catalyst score), wherein $$\text{catalyst raw score} = \frac{Y \cdot e^{-T}}{t \cdot M}$$

where Y is percentage yield (multiplied by 0.01), T is temperature in ° C. (multiplied by 0.01), t is time (in hours) and M is molar fraction of catalyst (as a fraction of 1 equivalent of the limiting reactant).

In some embodiments, the solvent efficacy score is log (1+raw solvent score), wherein $$\text{raw solvent score} = \frac{Y \cdot e^{-T}}{t}.$$

In some embodiments, the method further includes generating a training set for the graph convolutional model, the training set comprising: for the catalyst, a transform graph, a catalyst graph, and a catalyst efficacy score; and for the solvent, a transform graph, a reagents graph, a solvent graph, and a solvent efficacy score.

In some embodiments, the method further includes ranking each of the catalysts or each of the solvents or both based on a corresponding efficacy score.

In accordance with an aspect, there is provided a non-transitory computer readable medium storing a set of machine-interpretable instructions, which, when executed, cause a processor to perform a method for predicting reaction constituents, the method including: generating reaction data for at least one reaction; generating data representing a drawing of the at least one reaction based on the reaction data; generating a catalyst efficacy score, a solvent efficacy score, or both based on the reaction data; storing a graph convolutional model having at least one multilayer fully connected neural network, generated based on the reaction data and at least one of the catalyst efficacy score or the solvent efficacy score: wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and one or more reagents are inputs to the graph convolutional model; and predicting at least one catalyst or at least one solvent from a first reaction for a second reaction based on the reaction data by determining whether the first reaction and the second reaction have an identical core transform.

In accordance with an aspect, there is provided a computer-implemented system for predicting reaction constituents, the system including: a reaction data generator configured to store reaction data for at least one reaction; a drawing generator configured to generate data representing a drawing of the at least one reaction based on the reaction data; a scoring engine configured to generate a catalyst efficacy score, a solvent efficacy score, or both based on the reaction data; a storage unit defining a graph convolutional model having at least one multilayer fully connected neural network, generated based on the reaction data and at least one of the catalyst efficacy score or the solvent efficacy score: wherein for a catalyst, at least one graph representation of the catalyst and at least one graph representation of at least one reactant and at least one product are inputs to the graph convolutional model; and herein for a solvent, at least one graph representation of the solvent and at least one graph representation of at least one reactant, at least one product, and at least one reagent are inputs to the graph convolutional model; and a prediction engine configured to: (a) predict an effectiveness of a specified catalyst or a specified solvent for a specified reaction; (b) predict at least one catalyst or at least one solvent from a first reaction for a second reaction based on the reaction data by determining whether the first reaction and the second reaction have an identical core transform; or both (a) and (b).

In accordance with an aspect, there is provided a computer-implemented method for predicting reaction constituents, the method including: generating reaction data for at least one reaction; generating data representing a drawing of the at least one reaction based on the reaction data; generating a catalyst efficacy score, a solvent efficacy score, or both based on the reaction data; storing a graph convolutional model having at least one multilayer fully connected neural network, generated based on the reaction data and at least one of the catalyst efficacy score or the solvent efficacy score: wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and at least one reagent are inputs to the graph convolutional model; and predicting: (a) an effectiveness of a specified catalyst or a specified solvent for a specified reaction; (b) from a first reaction, at least one catalyst or at least one solvent for a second reaction based on the reaction data by determining whether the first reaction and the second reaction have an identical core transform; or both (a) and (b).

In accordance with an aspect, there is provided a non-transitory computer readable medium storing a set of machine-interpretable instructions, which, when executed, cause a processor to perform a method for predicting reaction constituents, the method including: generating reaction data for at least one reaction; generating data representing a drawing of the at least one reaction based on the reaction data; generating a catalyst efficacy score, a solvent efficacy score, or both based on the reaction data; storing a graph convolutional model having at least one multilayer fully connected neural network, generated based on the reaction data and at least one of the catalyst efficacy score or the

5

6 solvent efficacy score: wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and at least one reagent are inputs to the graph convolutional model; and predicting: (a) an effectiveness of a specified catalyst or a specified solvent for a specified reaction; (b) from a first reaction, at least one catalyst or at least one solvent for a second reaction based on the reaction data by determining whether the first reaction and the second reaction have an identical core transform; or both (a) and (b).

Other aspects and features according to the present application will become apparent to those ordinarily skilled in the art upon review of the following description of embodiments of the invention in conjunction with the accompanying figures.

BRIEF DESCRIPTION OF THE FIGURES

The principles of the invention may better be understood with reference to the accompanying figures provided by way of illustration of an exemplary embodiment, or embodiments, incorporating principles and aspects of the present invention, and in which:

FIG. 1 shows a table showing catalysis and solvent values of a network construction, according to some embodiments;

FIG. 2B shows a chemical reaction with mapped atoms for catalyst and solvent prediction, according to some embodiments;

FIG. 3 shows a palladium catalyzed coupling chemical reaction, according to some embodiments;

FIGS. 5A, 5B, 5C, 5D, 5E, 5F, 5G, 5H, 5I, 5J, 5K, and 5L are an XML representation of a single reaction, which captures all of the properties in a way that is both machine readable and suitable for rendering to present to a user, according to some embodiments;

FIG. 6 shows four chemical reactions, according to some embodiments.

FIGS. 7A and 7B show an implementation of degeneracy removal, according to some embodiments;

FIGS. 8A and 8B show selected examples of reactions from the catalyst training set, according to some embodiments;

FIG. 12 shows two network constructions, according to some embodiments;

FIGS. 13A and 13B show an example of Python/PyTorch source code for assembling the neural network for a catalyst model, according to some embodiments;

FIG. 15 shows three reaction schemes, according to some embodiments;

DETAILED DESCRIPTION OF EMBODIMENTS

Figure 2A:
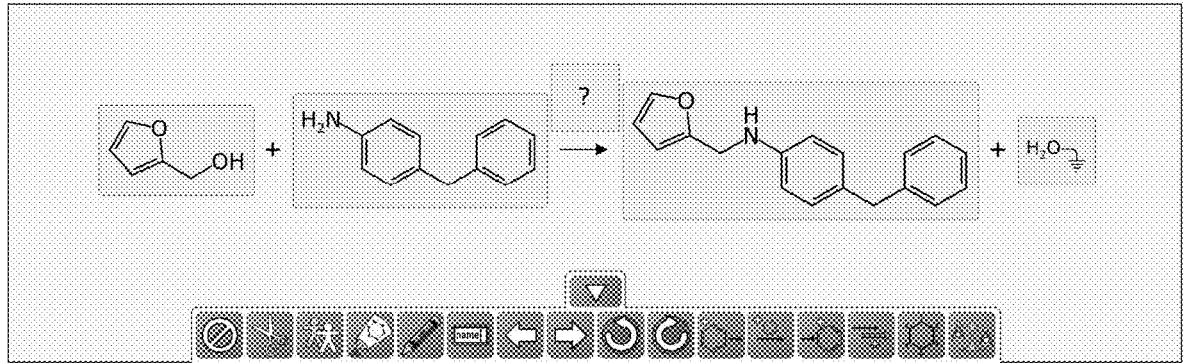
FIG. 2A shows a chemical reaction for catalyst and solvent prediction, according to some embodiments.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances, proportions may have been exaggerated in order more clearly to depict certain features of the invention.

The chemical reaction scheme is a concise and effective way to communicate a large amount of information between trained chemists, but it does suffer from a great many assumptions about common understanding, which has been a significant impediment to informaticians who have set about to digitally encode this information. This means that even when converted into digital form, they are far less comprehensible to a software program than they are to a trained chemist.

There is a very strong incentive to capture a sufficient amount of digital information about chemical reactions because this enables the creation of machine learning algorithms that can leverage generations of accumulated knowledge to predict how best to go about designing reactions to prepare new chemical compounds, or to optimize the procedures currently being used at scale so they can be done more cheaply and with less environmentally problematic ingredients or byproducts.

A major driver for reaction prediction is the pharmaceutical industry: it is widely accepted that the number of drug-like organic molecules is approximately $10^{5°}$, give or take a few orders of magnitude. The number is so large that it means that for any given molecule that may be proposed hypothetically as a potential therapeutic agent, chances are it has never been made before. Therefore a drug discovery campaign is beset by the constant need to analyze chemical structures and propose the most effective way to synthesize the molecule from feedstock ingredients that can be purchased as cheaply as possible. This has historically been the domain of the professional organic chemist, but in the data-driven era, a great deal of utility has been derived from software that can scale up by make use of known patterns to propose very reasonable syntheses (e.g. Lhasa, ICsynth, ChemPlanner, Reaxys and others).

The problem case of "Given molecule A, propose molecules [B, C, . . . ] from which it can be made" is very well explored, and there are multiple commercial offerings available. Once the basic scheme has been selected (i.e. B+C+ . . . →A) there is still much work to be done, even if the suggestion for reactants is suitable. An experimentalist needs to determine what conditions to use for the reaction. Two of the most important decisions that follow are the choice of catalysts and solvents.

The definition of catalysts and solvents can become nuanced, since their roles can sometimes overlap, but for most common cases it is straightforward.

A catalyst is a chemical species that is added to the reaction vessel in a proportion that is significantly less abundant than the reactants (on a mole-to-mole basis). It participates directly in the reaction's transition state, reducing the energy barrier needed to achieve the desired result, and does so favorably relative to unwanted side reactions, which also positively affects yield. In terms of the formal reaction definition the active catalyst species is regenerated, and in some cases may be partially recoverable. Some reactions proceed without any need for a catalyst. Many catalysts are based around transition metals, but there are many purely organic catalysts, as well as enzyme biocatalysts. Most laboratory scale reactions use homogeneous catalysts which are discrete molecular entities, whereas for large scale industrial reaction, heterogeneous catalysts are more common.

A solvent is a chemical that is typically purchased in bulk from a small set of commonly used options. It is selected so that the solubility profile favors the desired interaction: typically this means that the reactants, reagents and catalysts are all readily dissolved in solution, which is often achieved by matching polarity/hydrophobicity. Some reactions are driven forward by the insolubility of either the products or byproducts. There are many nuances: some reactions require no solvents (they solvate themselves or react in the solid state); others require more than one solvent to achieve reasonable results; some reactions require extremely high dilution; many reactions involve reactants or reagents that react with certain solvents, which makes them inadmissible.

Choice of catalyst(s) and solvent(s) is critical to the success or failure of a reaction. At the present time there are no effective software solutions to this problem.

The primary limiting cause for there being multiple software products that can propose effective reactions, but no general-purpose options for proposing catalysts or solvents, is data. Digitizing chemical reactions is a labor-intensive task, and until relatively recently there were only 3 major institutions that had invested the resources necessarily to do this curation manually: Chemical Abstracts, Beilstein (now Reaxys) and SPRESI. More recently various research groups have used text mining methods to extract large quantities of data from sources such as the USPTO, the most popular of which is from the Ph.D. thesis of Daniel Lowe. While the latter dataset is large and freely available, it also lacks the quality controls of the expensive curation procedures, and therefore comes with a great many caveats.

What existing reaction datasets have in common is that they are only partial digitizations of the chemical reactions that they describe. Computer scientists have been able to use these datasets to address the retrosynthesis problem, but when it comes to predicting catalysts or solvents, the available data sources do not provide sufficient information to build or evaluate the models necessary to achieve this.

Figure 16:
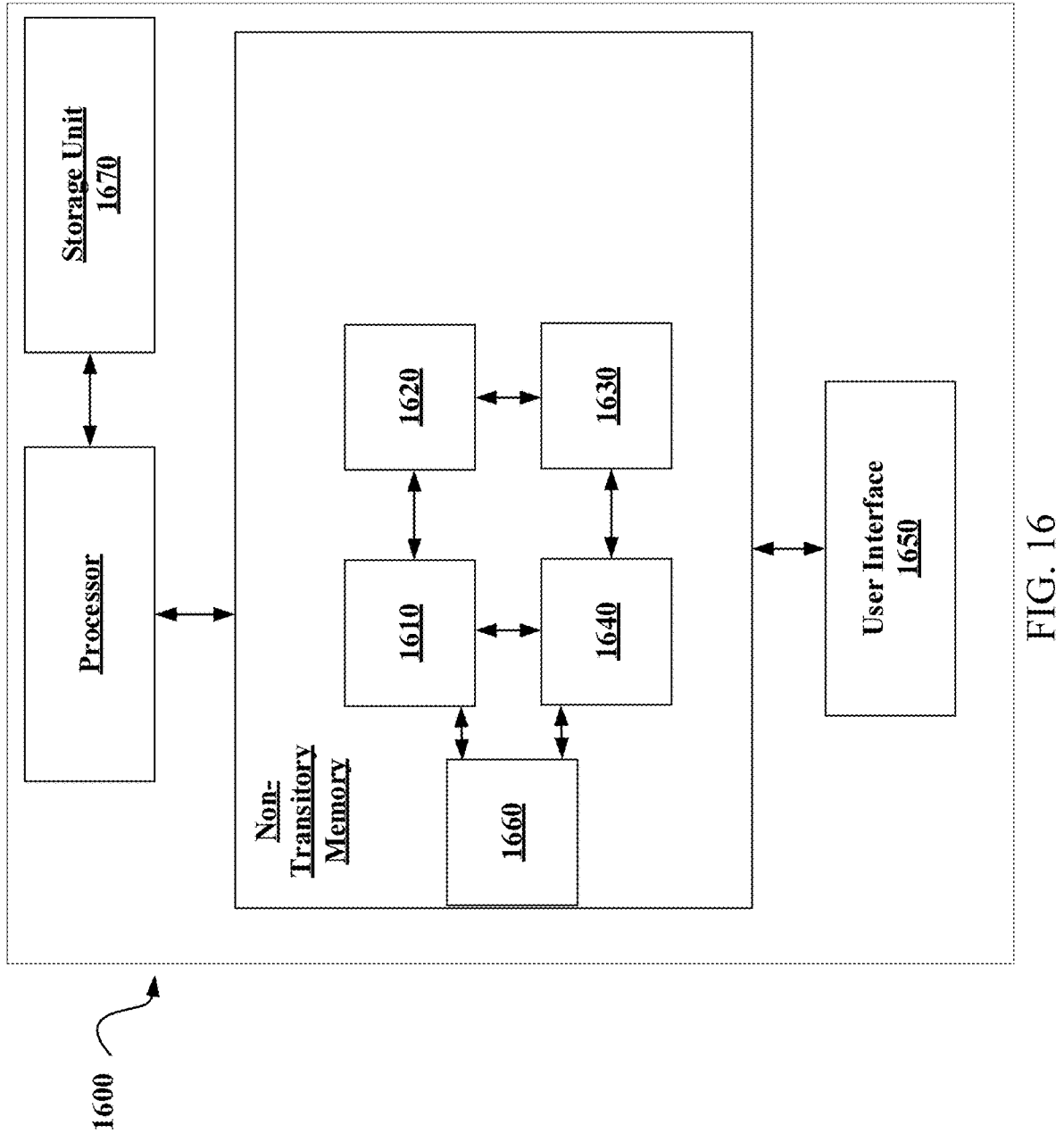
FIG. 16 shows a system for predicting catalyst and solvents for chemical reactions, according to some embodiments.

FIG. 16 is a schematic diagram showing an example system 1600, according to some embodiments. System 1600 includes one or more processing devices (e.g., processor) and one or more storage devices (e.g., storage unit 1670). The processing device is configured to execute instructions in memory to configure reaction data generator 1610, drawing generator 1620, mapping number generator 1630, model generator 1640, user interface 1650, and prediction engine 1660, according to some embodiments. Where described herein, select of these components are not included in some embodiments. In some embodiments, the system 1600 is configured to define and/or extract the minimum necessary data that must be captured for each reaction, in order to use it as training data; use of this data to create models for both catalyst and solvent predictions; and application of these models to real world cases with defined reactants and products where there is a need to determine which catalysts and solvents to use.

FIG. 1 shows a table showing catalysis and solvent values of a network construction, according to some embodiments.

In some embodiments, the system 1600 is configured for uses in drug discovery, process chemistry, green chemistry, and instances of chemical exploration.

In some embodiments, the system 1600 is configured to extract or curate sufficient reaction information, wherein a suitable data format is used and wherein a curation tool is used.

An example embodiment of the system 1600 will now be described. In some embodiments, actual curation work for the system 1600 has been done using the Molecular Notebook software, and data recorded using the XML DataSheet format with the Experiment aspect. The curation tool and file format combination must capture the following characteristics for each chemical reaction, namely, the individual components are described distinctly so that reactants, reagents and products are clearly separated from each other; the chemical structures of all stoichiometric reactants (including reagents) are included; the chemical structures of all stoichiometric products (including byproducts) are included; the chemical structures of the relevant catalyst(s) with special attention to bonding patterns for nonorganic molecules; the stoichiometry ratios for all reactants and products; balanced, so that molecular formula x stoichiometry results in exactly the same atom counts on both sides of the reaction (stoichiometric participants only); the atom-to-atom mapping for all stoichiometric reactants-to-products; where numbering is degenerate, it must be unambiguously resolvable by an isomorphism method; the atom group abbreviations (such as Et, Ph, Bz) must be resolvable to the specific structure being represented, either by encoding inline or providing a definitive lookup table; for catalysts, molar ratio is always provided; and the reaction time and temperature are provided, and yield for all non-waste product(s) is provided (which can be 0% for unsuccessful reactions).

In some embodiments, as used herein, a chemical structure is defined as a list of atoms, typed by element, formal charge, unpaired electron count, isotope, mapping number; atoms that have 2D or 3D coordinates; a list of bonds, typed by atom from, atom to, bond order, stereochemistry; the atoms and bonds act as nodes and edges of a labelled graph; hydrogen atoms can be omitted in most circumstances, as they are usually implied; atoms must either conform to a predefined formula for calculating the number of virtual hydrogen atoms or make use of an additional field to specify how many there are or the hydrogen atoms can be added as explicit nodes in the graph; bond orders must be one of 0, 1, 2, 3 or 4; use of the 0-order bond is not standard practice and is rarely necessary for organic molecules, but is used for representing many non-organic structures; chiral stereochemistry is marked by using up/down wedges as bond labels (for tetrahedral chirality) which are interpreted alongside atom coordinates; double bond (cis/trans) stereochemistry is indicated solely with coordinates; and functional group abbreviations are encoded as individual atom placeholders, with metadata (internal or external) to indicate their actual composition.

Figure 4:
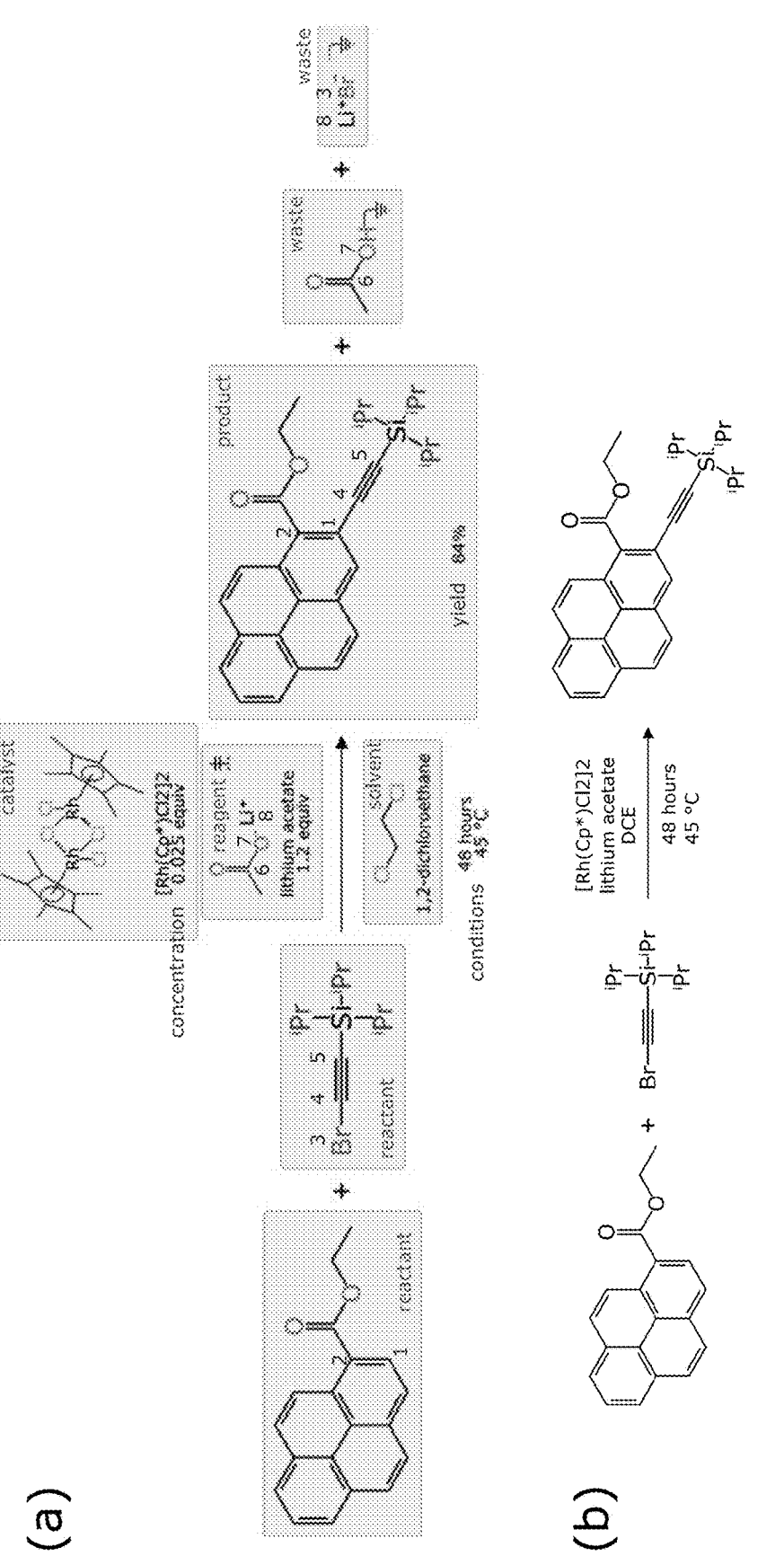
FIG. 4 shows three examples that summarize the detail of treatment for reaction schemes, according to some embodiments.

In some embodiments, the system 1600 is configured to implement and apply all of these steps in combination. In some embodiments, the system 1600 is configured to provide data sources providing this data per reaction in a way that can be parsed by a machine in an unambiguous way. Three different example granularities are shown in FIG. 4, according to some embodiments. First, a reaction that has been captured with all of the necessary data. Second, a chemical reaction that is representative of most reactions created using other digital information capture which omits much of the essential data. Third, shows the SMILES line notation, which strips out even more essential content.

FIG. 4 shows example granularities. First, is shown an example that exemplifies criteria according to some embodiments, with each reaction component being explicitly separated and classified, such that, all components are represented by structures that contain complete atomic treatment (including for inline abbreviations), atoms are mapped on both sides (partially shown, for clarity), reaction is fully balanced with all waste products indicated, and necessary concentrations and reaction conditions are stored as encoded metadata. Second, is shown an example showing a more common pseudo-informatic representation, as produced with software such as ChemDraw, such that, reagents and conditions are represented with unstructured free text, abbreviations are not mapped to a dictionary, waste products are omitted, the reaction is not balanced, and atom mapping is absent. Third, is shown an example showing the representation of the primary reactants and products using the popular SMILES line encoding, which has even less information, and also foregoes the aesthetics which could help a trained chemist recreate the missing details, according to some embodiments.

The same reaction shown in FIG. 4 can be encoded as shown in FIGS. 5A, 5B, 5C, 5D, 5E, 5F, 5G, 5H, 5I, 5J, 5K, and 5L, using XML. In principle any file format can be used, as long as it adheres to the requirements stated above, although in practice most industry standard formats may use non-standard extensions in order to achieve this.

In some embodiments, the system 1600 is configured to provide a method for classifying reaction component types, wherein the system 1600 is configured to use scheme information to distinguish between reactant, reagent, catalyst, solvent, product and byproduct.

According to some embodiments, the system 1600 stores a formal definition of a chemical reaction, which involves a list of materials added at the beginning, and a list of materials that are present after the transformation has occurred. Some of these materials are transformed by reaction with each other (reactants or reagents if they are inputs, products or byproducts if they are outputs). These are considered to be stoichiometric. Other ingredients in the reaction are formally unchanged, and these are often described as catalysts or solvents.

In some embodiments, the system 1600, at a reaction data generator 1610, is configured to generate and store reaction data for a given reaction. The data can include rules defining a reaction and/or for each of the types of materials. Classification of some materials can be subjective, for example, a solvent can also act as a catalyst; it is usually but not always obvious which are the desired product(s) and which are the unwanted byproduct(s). In some embodiments, the system 1600 is configured to generate training data by defining classifications according to the following rules. All components are initially tagged as being on the left hand side, right hand side, or in the middle; all reactants, reagents, products and byproducts must have atom-to-atom mappings that are perfectly balanced on both sides; solvents and catalysts must not have atom-to-atom mappings, thus partitioning these categories from other types; the difference between a reactant and a reagent is not important in this context as they are both stoichiometric inputs that are treated in the same way, however they are frequently curated differently: reactants are normally sketched on the left hand side of the reaction scheme, while reagents are normally sketched above or below the reaction arrow; reagents commonly do not indicate stoichiometry explicitly, and so it must be inferred by the stoichiometry of the products with which they share atom mappings; of the products, all but one of them must be explicitly marked as being a waste byproduct; the one product that is not marked as waste must be given a percentage yield (0 to 100%) which is a molar ratio; catalysts must be marked up with a molar ratio, either explicitly or implied (i.e. the number can be indicated as a molar fraction, or it could be given as a mass or volume that can be converted into a molar fraction relative to the primary limiting reactant(s)); and solvent quantity is optional but may also be stored or defined.

In some embodiments, the system 1600 is configured at the reaction data generator 1610 to classify each constituent based on data satisfying the foregoing criteria. For example, a component on the left hand side of the reaction arrow is classified as a reactant by the reaction data generator 1610. For example, a component on the right hand side of the reaction arrow is classified as a product or byproduct depending on whether it is marked as waste (i.e. this data is provided as part of the input) by the reaction data generator 1610. For example, for components in the middle (above/below the reaction arrow): if the molecule has any atom-to-atom mappings, it is stoichiometric and therefore is classified as a reagent; for all remaining such molecules, for which a molar quantity is specified or implied, it is classified as a catalyst as long as its molarity is less than 0.9 equivalents (i.e. it is sub-stoichiometric; note that in principle a catalyst could be used in excess, but for this system 1600, in some embodiments, these cases can be disqualified unless they are explicitly marked by the curator); for remaining molecules, a simple method is used for whether it appears to be a solvent (see below); and remaining molecules are classified as unknown.

According to some embodiments, in the steps referred to above for "looks like a solvent": must be composed of elements limited to H, C, N, O, S, F, Cl, Br; must have just one connected component; total charge must be zero; and number of heavy atoms must be 30 or less.

In some embodiments, the system 1600, at the reaction data generator 1610, is configured to generate and store reaction data, wherein the reaction data for a reaction includes the total time of the reaction and the temperature at which it was carried out. Optionally, the reaction in reaction data can be annotated as having been carried out at reflux, in which case a lookup table or other data structure is used to determine the lowest boiling solvent. According to some embodiments, as long as a boiling point is found to be available, this number will be used in lieu of using a specific provided temperature.

In some embodiments, reactions can be described as having multiple steps. Multistep reaction data can be stored, in which case steps after the first one have products (but not byproducts) from the previous step promoted to the reactant section and stored as such. In some embodiments, the system 1600, at the reaction data generator 1610, is configured to pre-process multistep reactions to convert them into multiple single step reactions, which are passed along to the subsequent steps in their simplified form. These single step reactions are stored as reaction data by reaction data generator 1610. Each step indicates a distinct reaction process within which the products are isolable: notation that describes transient intermediates or transition states is not applicable, according to some embodiments.

In some embodiments, the system 1600, at a drawing generator 1620, is configured to validate and expand out drawing artifacts, wherein all structures are complete, and consist of atomic elements or abbreviations that can be expanded to such, and wherein both sides of the reaction are balanced with regard to stoichiometry.

According to some embodiments, one or more reactions are drawn by drawing generator 1620 using abbreviations, for example, an atom can be given a name such as "Ph" referring to phenyl, whose chemical formula is C6H5. There is an unlimited number of possible abbreviations, for example, some of them are effectively universal, while others are specific to individual research groups. Many molecular representation procedures assume that there is a definitive lookup table for abbreviations, and this will suffice as long as the input data does not stray from this list. In some embodiments, the inline abbreviation approach is used—the actual molecular definition of the fragment is stored within the molecule definition. Using a dictionary lookup table is also used in some embodiments, but it incurs a centralization burden for maintaining the definitive reference collection.

Regardless of the sourcing of the abbreviation definition, this creates an additional step for atom mapping, such that, in accordance with some embodiments where the abbreviation-containing structure is represented in reaction data with a complete atom mapping, this means that only the connection point of the fragment has a unique mapping number. Because the abbreviations on both sides are defined to be equivalent, but not necessarily equal, this can be solved by each abbreviation-containing atom being treated as a pair, one atom on each side, based on the mapping number; subjecting the fragment on each side to an isomorphism search, where the connecting atom is mapped uniquely on each side, as shown in FIG. 6(a); using the first valid isomorphism mapping (there will be multiple in the case of symmetry, but only one is required); expanding out the abbreviation by aligning the fragment definition with its adjacent atom, and replacing the atom itself; and using the isomorphism mapping to create new atom-to-atom mapping numbers for the molecules overall (chosen to be unique across the whole scheme).

In some embodiments, the system 1600, at a drawing generator 1620, is configured to represent all reacting atoms with a 1:1 correspondence with product atoms by expanding by stoichiometry, which involves duplicating components when necessary by ratios are factored out so that the smallest value is unity and all values are integral. For example, if the lowest common denominator as 0.5 or 1.5, all stoichiometry values are multiplied by 2; components with stoichiometry greater than 1 are replicated accordingly; and atom mapping numbers will necessarily be degenerate when this occurs, which is resolved subsequently, as shown in FIGS. 6(b), (c) and (d). In some embodiments, data generator 1610 is configured to perform this function and, for example, provide the resulting data to drawing generator 1620, which can be configured to generate the drawing.

In some embodiments, for reactants that are drawn above or below the reaction arrow, the stoichiometry is inferred by the drawing generator 1620 (or data generator 1610, in some embodiments) rather than omitted, such that, for each unique atom mapping number contained in the reagent, the corresponding product component (containing that same mapping number) is identified; the stoichiometry of the product is divided by the number of occurrences of the mapping number in the reagent, and this becomes the stoichiometry, for example, if a unique atom mapping number corresponds to a product with stoichiometry of 2, then the reagent is assigned stoichiometry of 2; if the mapping number occurs twice in the reagent, and just once in the product, the stoichiometry is set to 1; and it is common for reagent atoms to map to more than one product, or with more than one multiplicity, and in this case more than one implied stoichiometry can be computed; if any of them conflict, drawing generator 1620 (or data generator 1610, in some embodiments) is configured to return an error condition.

In some embodiments, the system 1600 is configured to represent two sides of a reaction with implied mapping, wherein every atom on the left hand side has a corresponding atom on the right hand side with the same mapping number and wherein any degenerate mapping numbers can be unambiguously reclassified so that all atom pairs have unique mapping numbers. Reaction data generator 1610 is configured to store data representing same, according to some embodiments. Drawing generator 1620 is configured to generate a drawing of the reaction with the mapping, according to some embodiments.

At this point the reaction scheme consists of a list of stoichiometric reactant components, a list of stoichiometric product components, and a list of non-stoichiometric components. The first two lists (reactants and products) have been factored out according to their stoichiometry, so that counting the number of atom types on each side results in the same totals the reaction is balanced. It is also a precondition that for each of these components, all of the atoms have valid mapping numbers, and each mapping number is represented the same number of times on each side.

However, the mapping numbers can be degenerate, and system 1600 is configured to resolve this. Mapping number degeneracy can be an intrinsic property of the way the mapping was performed, or it can be introduced due to stoichiometric expansion, as shown in FIG. 6(c), with a correctly deduplicated version shown in FIG. 6(d).

FIG. 6 shows four chemical reactions, according to some embodiments. First, a reaction showing the expansion of an inline abbreviation (isopropyl): mapping numbers 1 & 2 are part of the original diagram, and 2 is carried over when the abbreviation is expanded; a restricted graph isomorphism will find either [3:3,4:4] or [3:4,4:3] which are equivalent. Second, a reaction with expandable stoichiometry and two-fold symmetry is shown in its concise form, as curated. Third, the same reaction has had its reaction components factored to achieve unit stoichiometry. Fourth, the degenerate atom-to-atom mapping numbers caused by the stoichiometry factoring are renumbered to keep them unique.

In some embodiments, system 1600, at mapping number generator 1630, is configured to remove any degeneracy. For example, if there are two atoms on each side that use the number "7", they can be split into [7, highest number+1]. However, because the only legitimate case for reusing atom mapping numbers is when at least one side of the reaction contains symmetry, a naïve solution will often cause an initial collapsing of symmetry, followed by subsequently invalid choices, and so a de-duplicate mapping algorithm is necessary. This can be implemented as follows: First, loop until all atom mapping numbers occur just once on either side. Second, for each mapping number m let Fm=number of times m occurs on each side. Third, let Mmax=maximum value of F. Fourth, for each mapping number m for which $F_m=M_{max}$: let AL=atoms on left hand side with mapping number m; let AR=atoms on right hand side with mapping number m; for all pairwise combinations of $a_i$ in $A_L$ and $a_j$ in $A_R$: let $d_i$=graph distance from $a_i$ to nearest atom for which the mapping number is unique, and let $d_i$=graph distance from $a_j$ to nearest atom for which the mapping number is unique. Fifth, record the values of [$a_i$, $a_j$] for which the corresponding value of $d_i+d_j$ is lowest (with the choice being arbitrary in the case of a tie). Sixth, let $M_{new}$=highest mapping number+1. Seventh, set the mapping number for both $a_i$ and $a_j$ to $M_{new}$.

The described steps iteratively reduce the degeneracy by one mapping pair for each cycle. Once completed, the mapping numbers are unique and functionally equivalent to drawing each equivalent fragment and mapping them separately. This enables the computer to provide an improved functionality for representing chemical reactions using system 1600.

An implementation of the foregoing steps is shown in FIGS. 7A and 7B, according to some embodiments. FIG. 7 is an implementation of degeneracy removal, using the Java programming language, according to some embodiments. The function calculateBFS is used to determine graph distance by breadth-first-search, according to some embodiments.

In some embodiments, system 1600 is configured to generate a dataset with sufficient data to build and validate a machine learning model, wherein curation of scientific data is performed to a degree of detail to allow the criteria to be met and wherein the amount of content generated is sufficient to provide coverage of reaction types and a favourable signal to noise ratio for the model.

Existing descriptions of chemical reactions do not meet the criteria for an appropriate dataset for accurately and efficiently representing chemical reactions or generating a machine learning model for predicting one or more appropriate catalysts and/or solvents for the reaction. For example, a common flaw with publicly available reaction data is that it is of very low quality, having been extracted at scale using fully automated methods. Commercially available reaction data is often curated at great expense and is therefore of higher quality, important data about the reaction is not captured in a machine-readable way. Essential information such as catalysts, solvents and by-products can be either omitted or described using unstandardized text shorthand notation as was used in the literature source. Reaction conditions are difficult to extract in a concise or consistent form. According to some embodiments, the system was built and tested using data that was curated from primary literature sources specifically for this purpose.

The dataset used consisted of approximately 3,500 curated reactions that passed the requirements set out by these claims. The system 1600 is not limited to any specific collection of reactions, but must meet the stated requirements.

Figure 9:
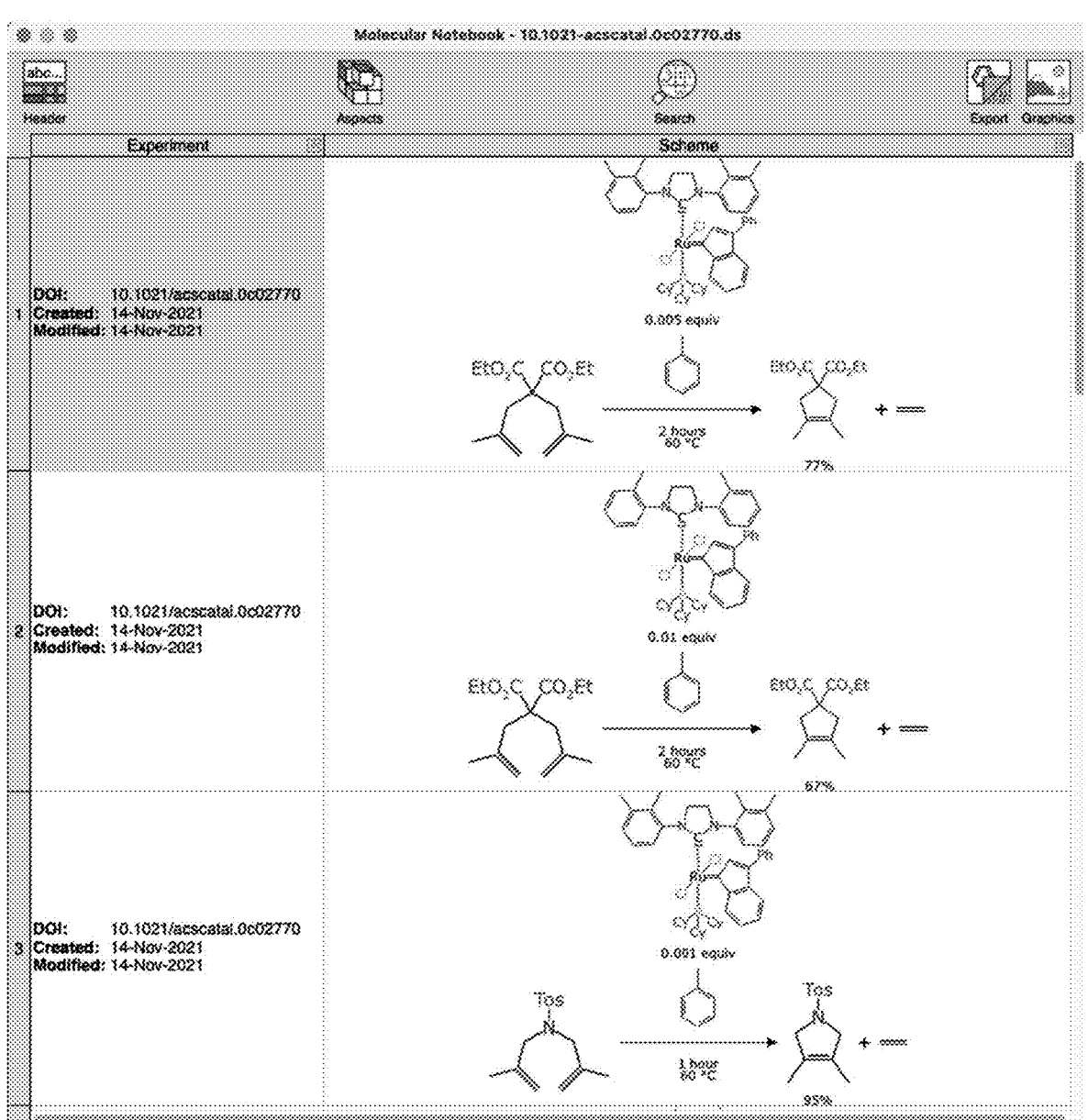
FIG. 9 is an example working session for curation of multiple reactions, according to some embodiments.

FIGS. 8A and 8B show selected examples from the training set used for catalysts, according to some embodiments of system 1600, and FIG. 9 shows an active editing session, according to some embodiments of system 1600.

The solvent training set is very similar and can be derived from the same source materials. The solvent training set is slightly larger because there are more reactions that use multiple solvents than use multiple catalysts.

FIG. 8 shows selected examples of reactions from the catalyst training set, according to some embodiments. The reaction scheme is shown in the leftmost column. The Catalyst structure is shown with inline abbreviations expanded out. The SideA and SideB columns show the algorithmically balanced stoichiometric reactants and products, with degeneracy factored out. Log Score is the composite score for the reaction, calculated from Molar, Yield (%), Time (hours) and Temp (° C.) which are extracted from the reaction definition, according to some embodiments.

FIG. 9 is an example working session for curation of multiple reactions, according to some embodiments. The software used is Molecular Notebook and the data is stored using the Molecular DataSheet XML format, according to some embodiments.

In some embodiments, system 1600, at scoring engine, is configured to score catalyst/solvent efficacy based on reaction scheme information, wherein for catalysts, the properties such as product yield, reaction time, reaction temperature and catalyst concentration can be combined together to make a single numeric score for efficacy, wherein for solvents, the properties such as product yield, reaction time and reaction temperature can be combined together to make a single numeric score for efficacy, and wherein this score can be described as linear score and its constituent terms are approximately interchangeable.

According to various embodiments, besides the choice of materials to add to a reaction, there are a number of parameters that can be varied in order to increase or decrease the efficacy. For purposes of modelling the effectiveness of a catalyst, it is reasonable to collapse the landscape of reaction metrics to just four measurable observables, namely, yield, catalyst concentration, temperature and time. The scientific justification is as follows, namely, yield of the desired product is the output metric, a perfect yield of 100% is ideal, whereas a yield of 0% indicates total failure to react; catalyst concentration is a limiting indicator of how effective the catalyst is, that is, the less of it that is needed to achieve a given result, the better; time is a limiting indicator such that, the shorter the duration, the better the catalyst; and temperature is a measure of energy input required to drive the reaction, and lower temperatures are indicative of better catalysts.

In some embodiments, scoring engine is configured to determine, generate, and/or store a function defining a relationship between catalyst concentration, time, and temperature. For example, these variables, in some embodiments, are antagonistically related to each other by a function. For example, in order to get the same yield with a smaller amount of catalyst, it may be sufficient to increase the time and/or temperature, and various other combinations. It should therefore be possible to combine these four characteristics, namely, the three input design parameters and one observable output metric into a single metric that describes the efficacy of the catalyst, as applied to that particular reaction transform.

In some embodiments, scoring engine is configured to generate this score as $$\text{catalyst raw score} = \frac{Y \cdot e^{-T}}{t \cdot M}$$

where Y is percentage yield (multiplied by 0.01), T is temperature in ° C. (multiplied by 0.01), t is time (in hours) and M is molar fraction of catalyst (as a fraction of 1 equivalent of the limiting reactant).

Because the raw score varies over many orders of magnitude, it is more effective to convert it into a score that can be modelled linearly taking the natural log, such that, catalyst score=log(1+raw catalyst score).

A value of 1 is added because reactions with a yield of 0 have a raw score of 0, so the final score has a minimum value of 0.

The composition of 4 values in this way into a single score makes assumptions about the underlying scientific processes going on within the chemical reaction, for example, it ignores the effects of solvents, effects of multiple catalysts, reaction drivers such as photocatalysis, methods of mixing and product extraction, exposure or lack thereof to air and water, etc. The hypothesis is that these other factors manifest as errors which approximately cancel out, and that when this score is used to build a model, that the predictions made by this model can be used to rank catalysts with real value to chemical reaction design.

For solvent efficacy the same approach is used except that solvent concentration is not included, such that, $$\text{solvent raw score} = \frac{Y \cdot e^{-T}}{t}$$

Unlike catalyst concentration, where smaller amounts of catalyst implies higher catalyst turnover (which is an indicator of catalyst power), the relationship between solvent volume is not so well established, so it is omitted.

In some embodiments, scoring engine is configured to generate the solvent score using the log function, but with an additional calibration, such that, solvent score=log(1+100× raw solvent score).

In some embodiments, scoring engine is configured to multiply the raw solvent score by 100 to spread out the values. Without this calibration the post-log outcomes are clustered near zero and can be difficult to train.

Figure 10:
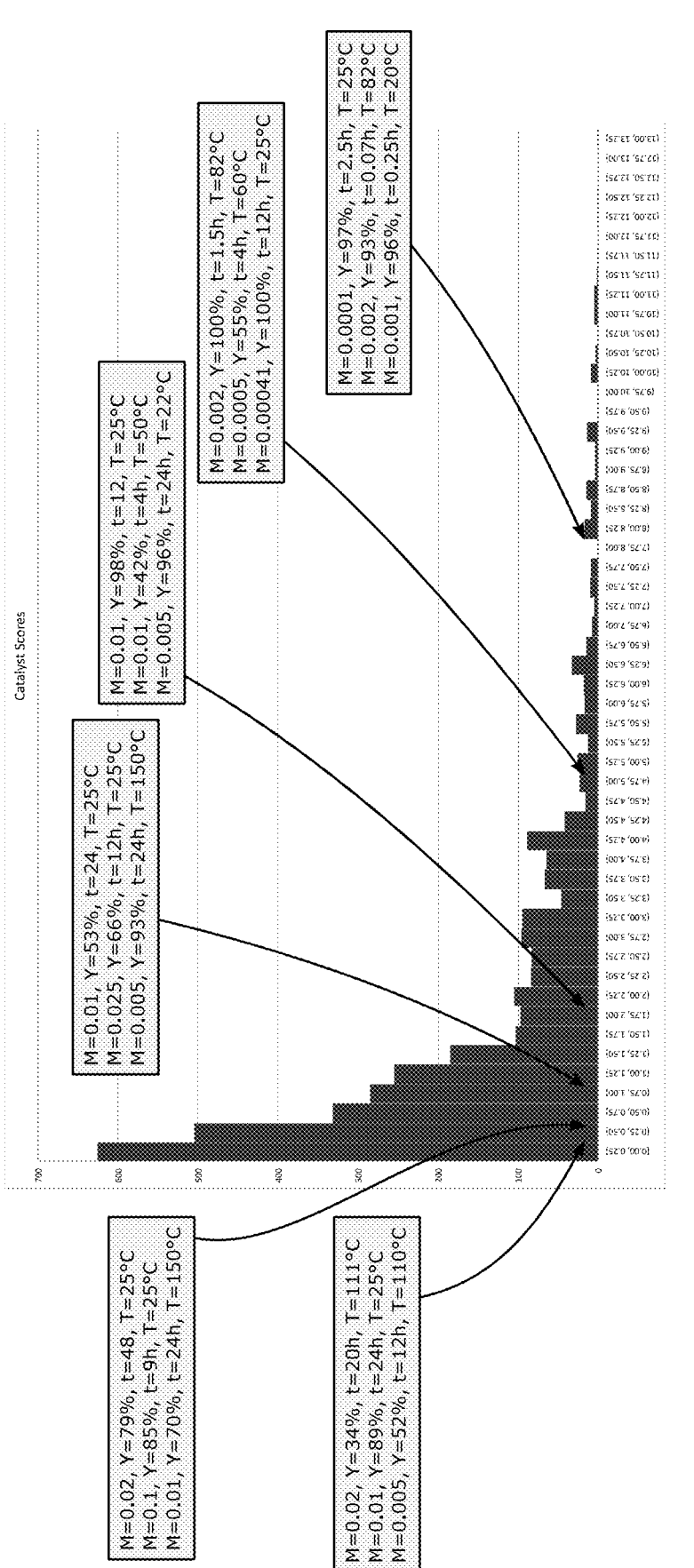
FIG. 10 is a histogram of catalyst frequency vs. bins of log(1+score), according to some embodiments.

FIG. 10 shows a histogram of the catalyst training data scored as described above, with bin size intervals of 0.5 log units, according to some embodiments. The 4-parameter score has a long tail at the high end, because optimizing all of these simultaneously is difficult and the truly exceptional catalysts are uncommon. This is in contrast to optimizing for a single property such as yield, for which most reported reactions have been reported to be within the upper quartile.

FIG. 10 is a histogram of catalyst frequency vs. bins of log(1+score). Higher scores are indicative of more effective catalysts. Several examples are shown for key intervals, where M is molar fraction of catalyst, Y is reaction yield, t is reaction time and T is reaction temperature. Higher scores tend to correspond to higher yields, lower catalyst concentration, shorter times and lower temperatures, but a deficiency in any one of these parameters can be compensated by the others, according to some embodiments.

One of the advantages of composing multiple reaction parameters into a single score using system 1600 is that it can accommodate the fact that for any collection of chemical reactions there is an extremely strong bias toward successful reactions. Mediocre or unsuccessful reactions are rarely reported even though they make up the overwhelming majority of experimental outcomes. The fact that there is a large spread between a good catalyst and an excellent catalyst (or solvent) means that a learning model implemented by system 1600 according to some embodiments has plenty of data to optimize toward better efficacy.

In some embodiments, system 1600 is configured to generate and define a graph convolutional model (and store same such as in storage unit 1670) using catalyst/solvent, reactants and products as inputs, wherein a multilayer fully connected neural network is created, wherein for catalysts, the two inputs are the graph representation of the catalyst and the graph representation of the reactants and products (the transform) such that graph representations of molecules are made using the "dot path" convention, bonds are expanded out into nodes for typing purposes, the transform is represented as a joined graph of both sides, with mapped pairs bridged by a bond category, and wherein for solvents the same design is used but with three graph inputs, namely, solvent, reagents and transform.

Prior to the construction of the graph convolutional network, the two input graphs are prepared by continuing the processing steps described in the previous claims. When modelling catalysis, for each reaction the following applies, namely, a list of stoichiometric reactant structures; a list of stoichiometric product structures; a 1:1 correspondence between reactant and product atoms; a catalyst structure; and a linear score for catalyst efficacy.

In some embodiments, system 1600 is configured to generate and define a graph convolutional model for solvents (and store same such as in storage unit 1670), as described in the foregoing, except substituting solvents for catalysts, and having the additional presence of reagents as a separate category.

The reactant structures can be combined into a single structure with multiple components, and likewise for the products, so that there are 3 structures to consider: reactants, products, catalyst (for catalyst models), or reactants, products, reagents and solvents (for solvent models). These are initially defined by storage unit 1670 using molecular connection graphs, according to some embodiments.

For analysis of these data structures, some meta-processing is performed by system 1600, such as removing certain kinds of artificial asymmetry like as aromatic ring bonds and other kinds of resonance-equivalent functionality. Because system 1600, according to some embodiments, is configured to operate on a diverse range of non-organic chemicals (including many/most catalysts), industry practices are insufficient: instead the chemical graphs are marked up/annotated (e.g., annotations are stored by system 1600) according to a treatment such as the Dot-Path method, according to some embodiments. The value of the method, relative to conventional practices, is that non-organic molecules can be drawn in many different ways according to the preferences of the scientist user of system 1600. The Dot-Path treatment effectively reduces any correct representation to the same graph labels. In summary, molecules are labelled with the following attributes, namely, atoms with their atomic element (unchanged from input); atom charges are encoded as being one of [<-1, -1, (-1 . . . 0), 0, (0 . . . 1), 1, >1]; and bond orders are encoded as being one of [0, (0 . . . 1), 1, (1 . . . 2), 2, (2 . . . 3), 3, >3].

In some embodiments, each graph convolutional model is generated by a model generator 1640 of system 1600.

Each of these classifications is converted by system 1600 into a token which is associated with the atom or bond, and from this point onward.

In order to simplify the subsequent graph neural network, in some embodiments, model generator 1640 is configured to convert the chemical graphs from having node and edge labels to only node labels by taking each edge and converting it into a node with the corresponding properties, as shown in FIG. 11(a), which simplifies the implementation of the graph convolutional network. The graph convolutional network can be stored by system 1600 in storage unit 1670.

According to some embodiments, system 1600 at model generator 1640 is configured to define three graphs (reactants, products, catalysts) or four graphs (reactants, products, reagents, solvents) for which each node has at least one token associated with it, and edges are unlabelled. The reactant and product graphs are about to be combined into a single graph to represent the transform. Before this is done, the reactant atoms can be further labelled with a [LHS] token, and the product atoms with a [RHS] token, in order to ensure that they are distinguished after the combination.

The combination process itself involves creation of a bridge node between each pair of atoms, joining the reactant atom with the product atom, shown in FIG. 11(b).

Figure 11:
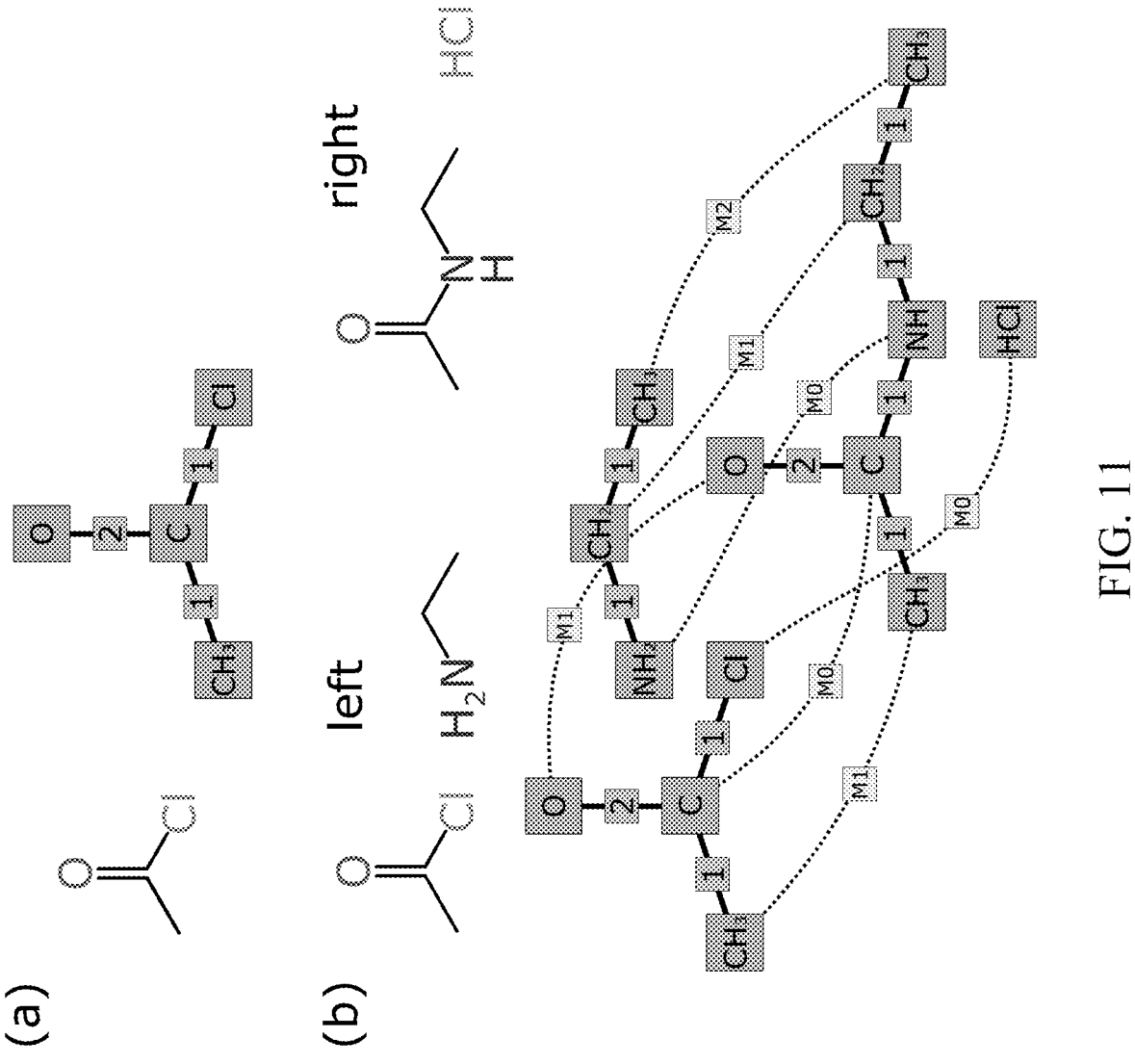
FIG. 11 shows two preparations, according to some embodiments.

FIG. 11 shows two preparations, according to some embodiments. First, a simple molecular connection table is converted into a node-labelled graph by expanding out bonds into nodes. Second, the transform graph is constructed by grouping together the left and right hand sides of the transform and joining the nodes together by linkers denoting the distance from the atoms that are changed in the reaction, according to some embodiments.

These bridge atoms are labelled according to their distance from a reacting center. For a reacting center, for any mapped pair of atoms in the reactant and product, system 1600 is configured to determine whether the graphs on both sides correspond to atoms with the same mapping numbers, same element states, and the same bond orders. Atom pairs for which this is not the case are considered to be part of the reacting center and are assigned a reacting distance of 0. Atom pairs for which one of their neighbours (on either side) is part of the reacting centre are considered to be adjacent and are assigned a distance of 1. This adjacency determination is percolated outward, with an optional maximum, for example, in which case all reacting center distances have a value between 0 and 3. The bridging atoms that connect the reactant and product after they are combined to form the transform graph are labelled with a token of [M0, M1, M2 or M3] depending on the distance.

This method is applied by model generator 1640 to all of the reactions in the training set such that each one now consists of three properties in total for catalysts: [transform graph, catalyst graph, score] or four properties for solvents: [transform graph, reagents graph, solvent graph, score]. A list of all used tokens for all of the transform graphs is collected, and each unique token becomes one of the graph descriptors for transforms: for any given atom in a transform graph, it either has or does not have the token, and hence a binary set of descriptors can be created, for example, if the available descriptors were [N0, Z0, P1, O1, O12, O2, . . . , LHS, RHS] then an atom with tokens [Z0, O1, LHS] would be described by the bit vector [0, 1, 0, 1, 0, 0, . . . , 1, 0]. This is commonly referred to as one-hot encoding, and it is a form that is ideal for use with machine learning.

Each graph now has an arbitrary number of nodes, each of which has a one-hot encoded description, and a set of connecting edges, which are unlabelled. The deep neural network can be constructed by model generator 1640 according to the following pipeline, in which the two separate graphs (transforms and catalysts) or three separate graphs (transforms, reagents and solvents) are subjected to their own graph convolution pipelines, and then their output hidden layers are concatenated, and subsequently treated as a conventional linear dense multilayer neural network. An example of constructing such a network is shown in FIG. 12(a). The propagation of the graph convolution layers uses a custom implementation of a method described at https://arxiv.org/abs/1609.02907, the entirety of which is hereby incorporated by reference except to the extent contradictory to the description herein.

An appropriate set of parameters for the network is as follows, namely, each hidden layer for the graph convolutions (4 each) is of size 256. For catalysis models, for a given input reaction, the result is two matrices of shape [nodesT× 256] and [nodesC×256] for the transform and the nodes respectively; in order to hand off the graph convolutional part of the network to the dense linear layers, the average values are computed for each column, resulting in two single-row matrices both of shape [1×256] which are the concatenated into a vector of size 512. This vector is passed forward into two linear layers of size 128 and 64, and then finally mapped into a single output value; and the linear layers are treated with a dropout ratio of 0.2 in order to reduce overtraining.

Network construction for solvents by model generator 1640, as shown in FIG. 12(b), follows the same procedure, except that there are three input graphs. The solvent graph contains a single solvent, which is the species being evaluated, analogous to the procedure for catalyst modelling. The second graph contains each of the reagent components for the reaction, if any, combined into a single graph: for this purpose, a reagent is defined as any molecular species present in the reaction that does not participate in the transform, and is not a solvent. The third graph contains the transform, and is constructed in the same way as for catalyst modelling.

FIG. 12 shows two network constructions, according to some embodiments. First, a network construction for catalysis, such that, the catalyst and transform graphs are transmitted through 4 layers, each of which has a vector of size 256 per node, with a variable number of nodes per graph. Following the graph layers, the node values are averaged (per graph) to produce a flat vector of size 256. Catalyst and transform vectors are concatenated, and the resulting size 512 vector is passed through two linear layers of size 128 and 64 respectively, before being combined into a single scalar, which is the predicted score. Second, a network construction for solvents is the same as for catalysts, except that there are three sets of graphs: solvent, reagents and transform.

FIGS. 13A and 13B show an example implementation of the network constructs, using Python/PyTorch, according to some embodiments. Similar implementations could be used for other common frameworks such as TensorFlow among others. The main model optimization loop uses boilerplate code (not shown).

FIGS. 13A and 13B is an example of Python/PyTorch source code for assembling the neural network for the catalyst model, according to some embodiments. The solvent model is analogous, according to some embodiments.

The catalysis and solvents models have been trained to achieve the following metrics, after ca. 24 hours using a midrange GPU, as shown in FIG. 1.

In some embodiments, system 1600 at prediction engine 1660 is configured for implementing a method for filtering catalyst/solvent candidates based on same core transform, wherein two reactions are converted into stoichiometrically mapped pairs, wherein any atom whose environment is not identical on both sides is considered to be part of the transform, wherein these two reactions can be ascertained to have the same transform or not, and wherein a catalyst from reaction 1 is considered a suitable candidate to suggest for reaction 2 if and only if they share the same transform. In some embodiments, prediction engine 1660 is configured to generate one or more predictions (e.g., a ranked list) for catalysts and/or for solvents based on reaction data representing other reactions sharing the same core transform.

In some embodiments, system 1600 is configured to receive as its input any instance of a chemical reaction and any catalyst/solvent, hypothetical or otherwise, and the total domain space is exceedingly vast. Even if every reaction ever performed by chemists were to be incorporated into the training data it would only cover a tiny fraction of the total possibility space. Accordingly, in some embodiments, prediction engine 1660 is configured to generate a list of catalysts and/or of solvents that have been applied to the same reaction transform as that for which a catalyst or solvent is being sought, where the list of those candidates is ranked by predicting their efficacy using the technique described herein. While this can eliminate some novel use cases, it can be expected to reduce the options down to a reliable subset which can provide advantages.

Given two normalized reactions for which atoms on either side have a 1:1 mapping correspondence (e.g., generated as described the foregoing) the atoms that are determined as having changed (e.g., generated as described in the foregoing) are marked.

A new labelled graph is generated by system 1600 based on the following steps: First, iterate over each mapped atom pair which has been marked as changed by creating a node, labelling with the element (which is same on both sides), and if the charge on either side is not zero, incorporate the charges of both sides into the label. Second, iterate over each combination of atom pairs for which both are marked as changed, there is a bond between the atoms on either-or-both sides by creating an edge, labelling with the bond type from both sides, which is one of either no bond (which can be the case for at most one side), aromatic bond (as described previously) or bond of specific order (0 to 4).

The result is essentially a subgraph of the modified portion of the reaction, with labels from both sides of the graph. The transform subgraph is treated with a canonical priority ordering algorithm that is analogous to techniques that are commonly used for individual structures, in order to guarantee that any two graphs that are equivalent in every way except for node ordering are re-ordered into a graph that is exactly the same.

In some embodiments, system 1600 is configured to implement a method is as follows, namely, the node labels are converted into a string form which is sorted alphabetically and reduced to the unique subset; each node is then assigned a priority value equal to its index in that sorted unique subset (i.e. $0 \leq \text{pri} < N$ where N is the number of unique labels); and for a loop, each node is assigned an adjacency priority as $$\sum_{n,e}^{adj} (P_n + M_1 \cdot O_e^L + M_2 \cdot O_e^R),$$

where n and e are the nodes and edges; P is the current priority of the given node; $O^L$ and $O^R$ are the bond orders on the left & right sides (adjusted so that the lowest value is zero); $M_1$ and $M_2$ are set to 2×N and 20×N, where N is the total number of nodes, the priority values are rederived so that any two nodes with the same priority are sorted in order of the adjacent priority value and broken into smaller groups, if the rederived priority values are all unique, exit the loop, if the number of unique priority values was increased by the above algorithm, continue the loop otherwise, invoke the special tiebreaker to remove degeneracy.

The special tiebreaker method is invoked when degeneracy cannot be resolved by the foregoing method, which means some combination of two things, first, there are nodes that are symmetrically equivalent and/or second, there are nodes that appear to be so, but upon examination by a more expensive graph walk algorithm are found to be different.

The method is as follows, namely, consider the lowest priority value that is degenerate; iterate over each node (2 or more) which has that priority value; generate a walk array by starting at the given index and visiting each node exactly once in a series of shells (aka breadth first), such that, if a node has yet to be visited, and is connected to a node in the previous shell, add it to the current shell, make a sorted list of the priorities of the nodes for the current shell and add these to the walk array followed by a value of 0 (which separates by shell), if the shell is empty, exit, mark all nodes in the shell as having been visited; select the node with the lowest corresponding walk array, determined by array length or the first differing element, with an arbitrary choice being made in the case of equivalence; and the selected node keeps its priority, whereas all other nodes with same-or-higher priority have their priority value increased by one.

In this way, degenerate priority values are perturbed in order to induce false asymmetry. This percolates through the encapsulating method, causing the nodes to be assigned a unique priority order that can be used to generate hash codes that are canonical, i.e. any two equivalent graphs are guaranteed to produce the same code, while non-equivalent graphs are guaranteed to produce different codes. This is visually indicated by FIG. 14, which shows two reactions based on the same transform.

Once the priority order has been established, the canonical hash code is composed according to the following method, such that, let hash code=blank string; and loop for atom in atoms ordered by lowest priority first, namely, let bond=connection to previous atom in sequence (if applicable), concatenate hash code with [bond, atom] token, other bonds connected to atom are marked with a join token.

The method for creating the canonical hash code from the tokens and priority order is similar to the way that a SMILES string is constructed from analogous input conditions.

In some embodiments, prediction engine 1660 is configured a prediction engine configured to predict the effectiveness of a specified catalyst or a specified solvent for a specified reaction, for which the constituent molecules may or may not be previously known. The specified catalyst, solvent, and/or reaction can be a user-provided catalyst, user-provided solvent, and/or user-provided reaction, respectively, can be received by prediction engine 1660 via a user interface 1650, for example.

Figure 14:
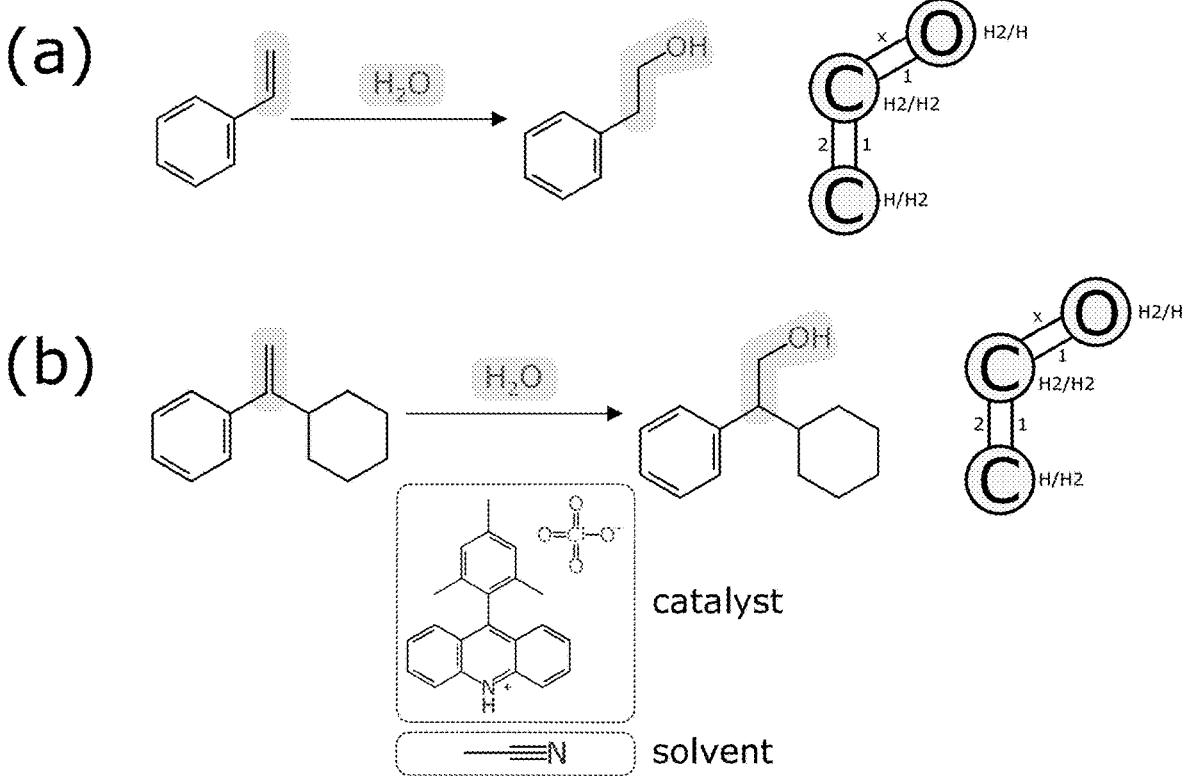
FIG. 14 shows two reactions ascertained to have the same core transform, according to some embodiments.

FIG. 14 shows a query reaction, according to some embodiments. First, the query reaction is shown where there are 3 atoms that experience a change in their immediate environment (C, C, O) shown to the right. Each of these 3 changed atoms is labelled by its element, hydrogen counts and charges on either side of the transform, and bond orders. Second, the fully described query reaction, derived from the training set, shows the excised changing atoms (C, C, O) are isomorphic and thus have the same transform. The indicated catalyst and solvent options can be added to the available list, according to some embodiments.

FIG. 15 shows three reactions, two of which share the same core reaction transform, and thus have the same canonical hash code as generated by system 1600, according to some embodiments.

FIG. 15 shows three example reaction schemes according to some embodiments, each showing the substructures for the reactant and product cores, which are made up of the atoms whose immediate environment changes during the reaction transform. Reactions (a) and (b) have the same core transform, which is reflected by the canonical hash codes being equal. Reaction (c) has a different core transform, and a different canonical hash code, according to some embodiments.

In some embodiments, system 1600 is configured to apply a predicted catalyst/solvent efficacy to a partially specified reaction, wherein a proposed reaction transform and a proposed catalyst are used as inputs for the machine learning model, wherein the predicted outcome is a measure of suitability of the catalyst to the desired reaction, wherein the predicted outcome is suitable for ranking catalyst candidates, with practical value for synthesis design, wherein a proposed reaction transform, proposed reagents and a proposed solvent are used as inputs for the machine learning model, wherein the predicted outcome is a measure of suitability of the solvent to the desired reaction, and wherein the predicted outcome is suitable for ranking solvent candidates, with practical value for synthesis design.

For applying catalysis models, the inputs consist of a chemical reaction description that includes reactants, products and stoichiometric reagents, where all atoms are mapped and the atom ratios are balanced, as described in previous sections. Solvents and non-stoichiometric reagents are omitted. This represents the desired reaction, about which the prediction is being made. To this input is added a single catalyst. The reactants/products/catalyst are converted to the inputs for the graph convolution model using the same technique as is applied to the training data when building the model.

For applying solvent models, the inputs follow the same requirements as above, except that all molecules not involved in the transform, and not classified as solvents, are combined into a reagents graph. A single proposed solvent is included in the inputs (and any previously established solvents are omitted).

The graph convolution and dense linear layers are run in the forward direction, and the final output is a single number. This is a prediction score that corresponds to the values that were used to train the model, that is, a composition of reaction time, temperature, catalyst concentration [for catalyst models only] and product yield.

This predicted value is directly comparable to predictions made for the same reaction but with different proposed catalysts/solvents.

For use in practical organic synthesis, the scientist user begins with the reaction that is desired. A list of catalysts to investigate must then be produced. One way to compile a list of known catalysts is to simply enumerate all catalysts found in the training set and reduce them to the unique subset, for example, by using a method such as described. These can be further filtered based on the subset of catalysts that were used in the training set for reactions with the same transform, as generated as described in the foregoing.

Once the catalyst(s) have been decided upon, the solvent model can be run: a list of known solvents is produced in the analogous way, and each is ranked according to the model.

The scientist user is free to provide any balanced chemical reaction and any chemical structure for a proposed catalyst, with the caveat that proximity to the training set can be expected to produce more reliable results. The same applies for solvents, although it is unusual for scientist users to deviate from a relatively small set of organic solvents that are available in bulk, so the large majority of proposed solvents will have some representation in the training set.

In some embodiments, once a set of predictions have been made for multiple catalysts applied to the same reaction, the output can be used to rank the catalysts or solvents. The catalysts/solvents with the highest ranking predictions are the most likely to produce favorable results, and so can be investigated first. In some embodiments, these predictions and/or ranked lists are displayed at a user interface 1650. In some cases, the best ranked catalysts may have other constraints, for example, lack of availability, high cost, hazardous properties etc., in which case they may be passed over in favor of a lower ranking catalyst that better matches the above requirements. In planning the specific conditions of the reaction once the catalysts have been selected, it is typically recommended to search for an example synthesis using the catalyst on a starting material with similar functional group tolerance. For solvents, green chemistry considerations are often a priority early in reaction design, for example, in ideal circumstances most reactions would be carried out using water as the solvent, but when this is not viable there is a decreasing order of cost and environmental problems that should inform the final choice.

In some embodiments, system 1600 is configured with an interactive user interface 1650 (e.g., implemented at a device) for proposing catalysts and solvents based on provided reaction scheme, wherein a reaction can be proposed using an interactive tool, wherein the reaction transform is validated, and then for each reaction in the training dataset that shares the same transform, its catalyst is added to a list of candidates, wherein the list of catalyst candidates is reduced to a unique list such that graph isomorphism using "dot path" labelling is used to determine if catalysts are the same, wherein each unique catalyst candidate is submitted to the model to predict efficacy, wherein the candidates are ranked in order of their predictions, highest first, wherein the user interface guides the scientist to make a selection based on these predicted criteria. The user may choose to override the highest-ranking prediction(s) for other reasons, for example, cost, familiarity, personal preference, etc., wherein instead of a user interface, reactions can be annotated at scale by filling in the highest-ranking catalyst(s) and outputting candidate reaction schemes, which can be used by follow-on methods, and wherein the analogous procedure can be used for solvents, either before or after catalyst selection.

The steps described in the foregoing are rendered into an interactive tool. The steps are shown graphically in FIGS. 2A to 2G, according to some embodiments.

According to some embodiments, a simple example of catalyst and solvent prediction for a proposed reaction using this workflow is as follows: First, as shown in FIG. 2A, the user draws a chemical reaction, and makes sure that the reactants & products are balanced. Second, as shown in FIG. 2B, special attention is given to the atom-to-atom mapping, and to making sure that the core transform is correctly indicated. The user interface provides convenient features for checking this, as shown below: mapped atoms are indicated with a mauve background (or solid circles if monochrome), atoms that are part of the core transform are highlighted in green (with a dotted outline), and when the mouse cursor is positioned over a mapped atom, its corresponding atom on the other side of the reaction is also shown (in this case, the nitrogen atom).

Figure 2C:
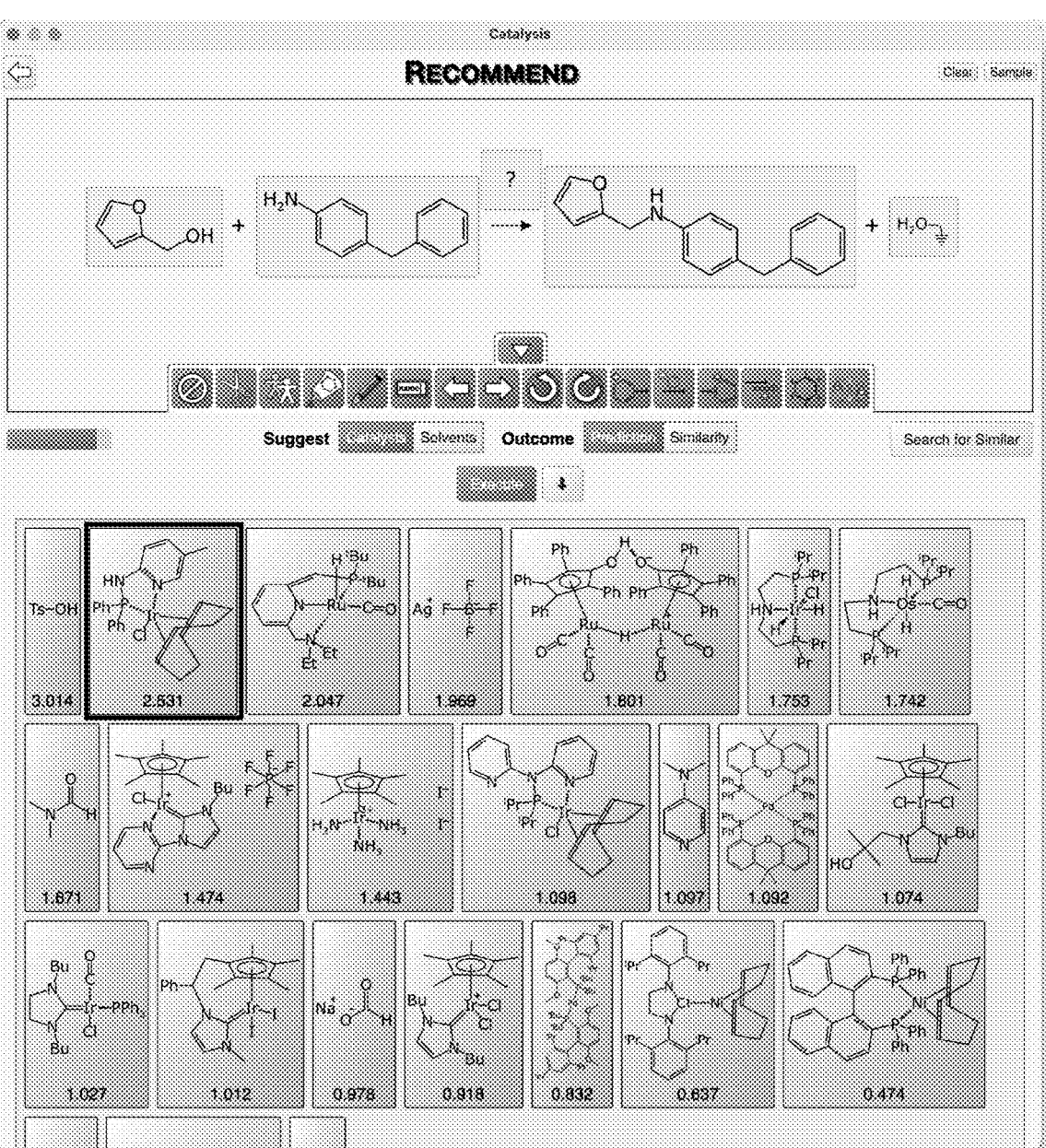
FIG. 2C shows a chemical reaction and a corresponding ranked series of proposed catalysts, according to some embodiments.

Third, as shown in FIG. 2C, predicting of catalysts is requested, which shows a ranked series of catalyst proposals. In this case the top ranked catalyst (Ts-OH aka toluene sulfonic acid) is passed over because it is usually a co-catalyst. The second highest ranked catalyst, an Iridium-based coordination complex, is picked for further investigation.

Figure 2D:
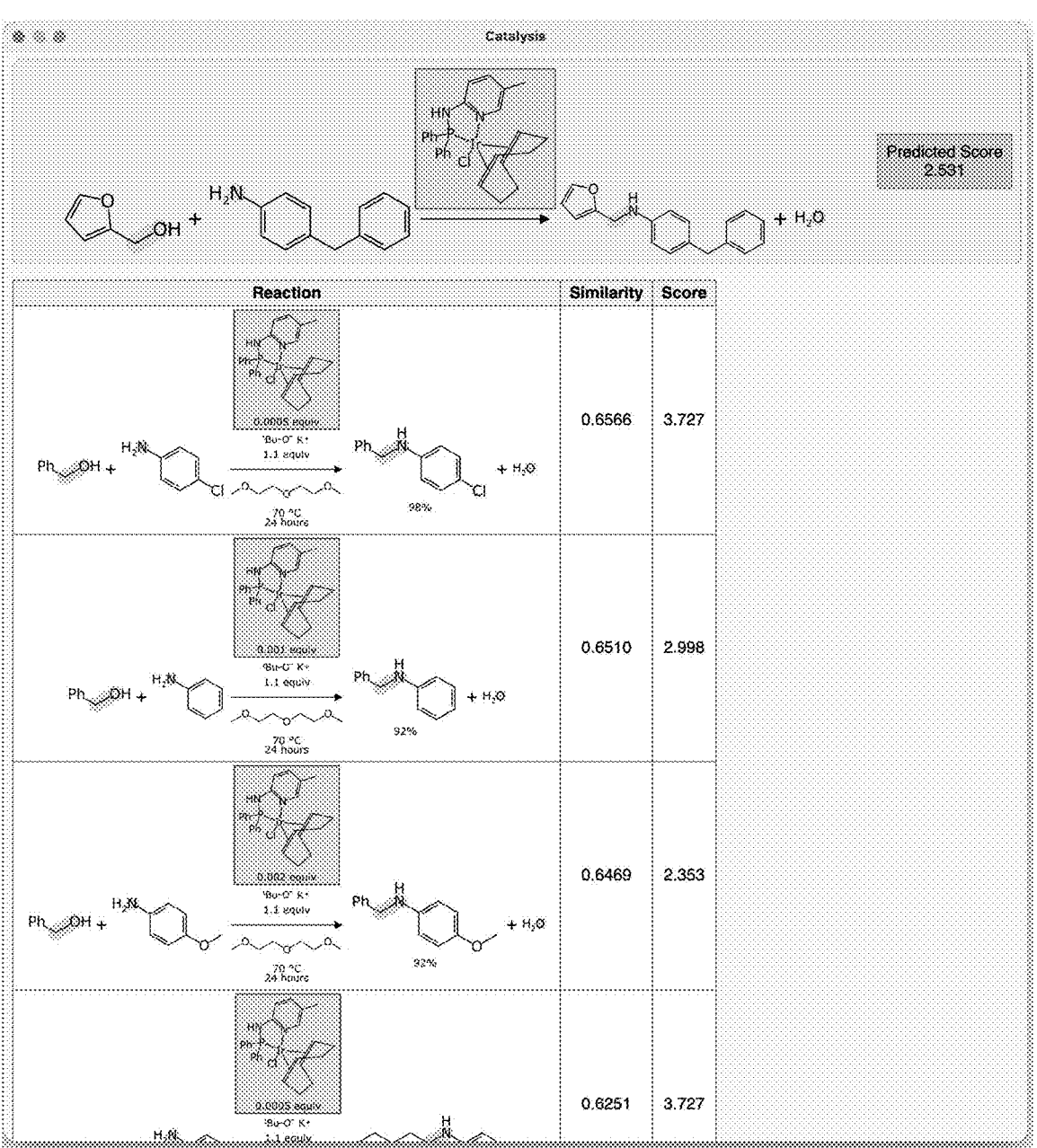
FIG. 2D shows a chemical reaction and a subset of the corresponding ranked series of proposed catalysts, according to some embodiments.

Fourth, as shown in FIG. 2D, the user selects the Show Evidence option, which executes a similar procedure to that which was used to generate the candidate list. All reactions in the training dataset with the same core transform and same catalyst are shown, ranked by the similarity of the reactants and products to the currently proposed reaction. In this case there are four examples of reactions with the same transform and catalyst, with varying degree of similarity to the proposed reaction starting materials. The catalyst scores are derived from each of these reactions and shown (3.727, 2.998, 2.353, 3.727) as compared to the predicted value of 2.531.

Figure 2E:
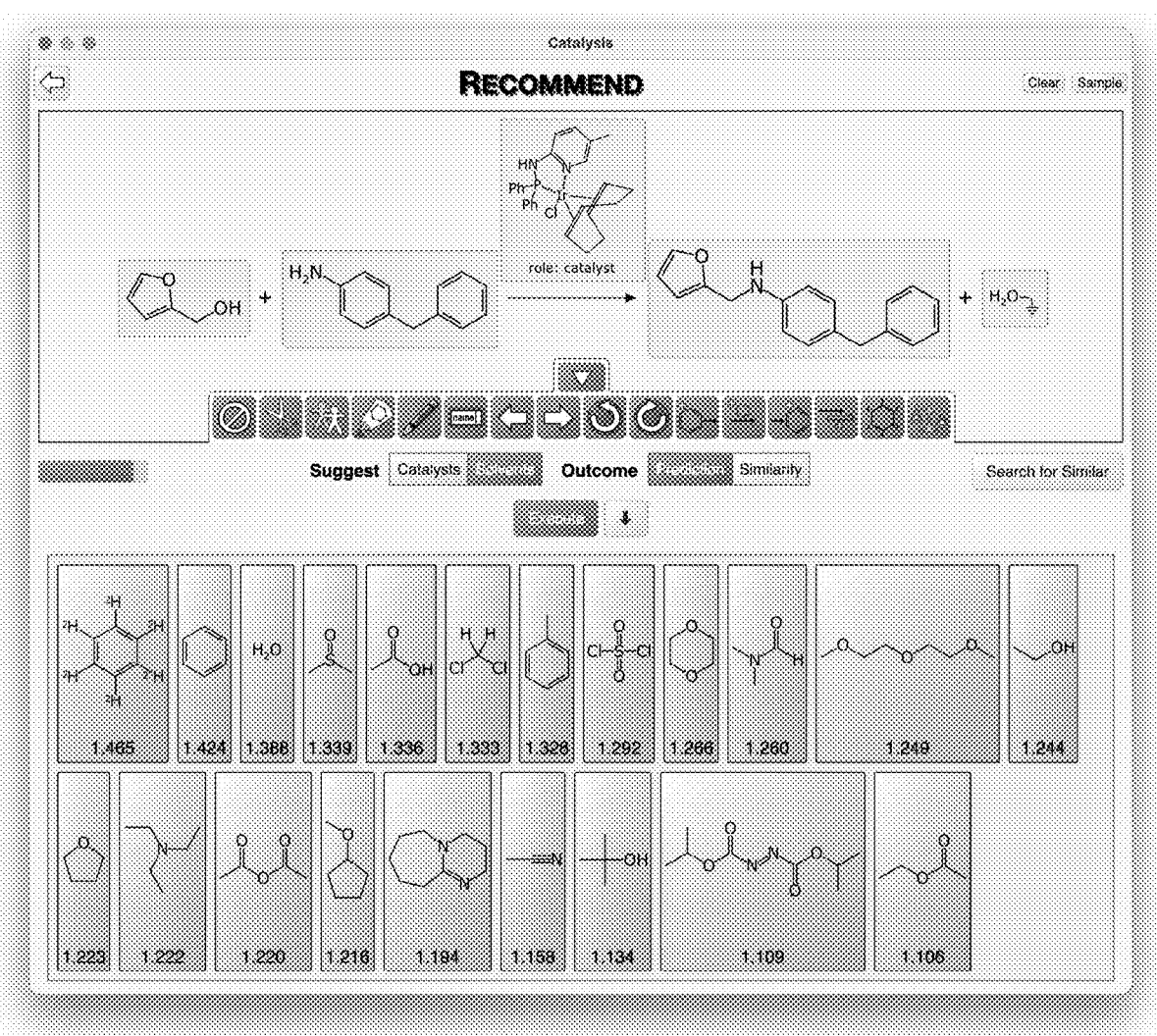
FIG. 2E shows a chemical reaction and a corresponding ranked series of proposed solvents, according to some embodiments.

Fifth, as shown in FIG. 2E, the user selects this catalyst, and it is added to the reaction scheme. The next step is to propose a solvent, for which a number of ranked options are proposed. The predictions make use of the reactants, products and the selected catalyst, all of which are important. The highest ranked solvents are benzene and its deuterated analog, which are passed over on account of having relatively high toxicity. The third most highly predicted solvent—water—is an ideal choice, so it is worth invoking the evidence panel.

Figure 2F:
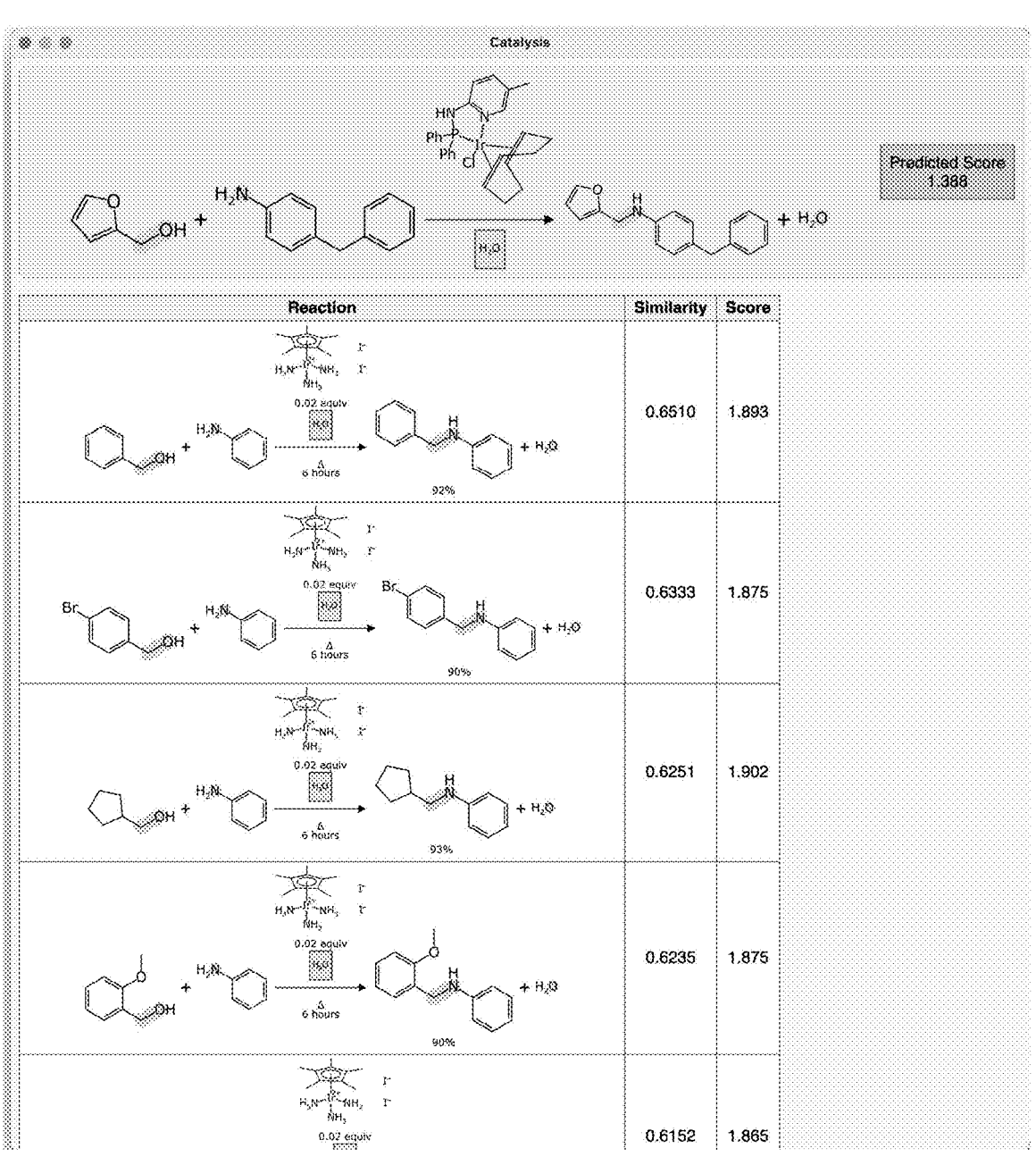
FIG. 2F shows a chemical reaction and a subset of the corresponding ranked series of proposed solvents, according to some embodiments.

The examples, as shown in FIG. 2F, include only reactions with the same transform, but a variety of different catalysts. It can be noted that the most applicable predictions are for reactions where the catalyst is ionic, which means that it is much more likely to have high water solubility, and so these predictions are not likely to apply to the reaction/catalyst combination that is being proposed. This is an example of where a larger training set would alleviate the problem.

Figure 2G:
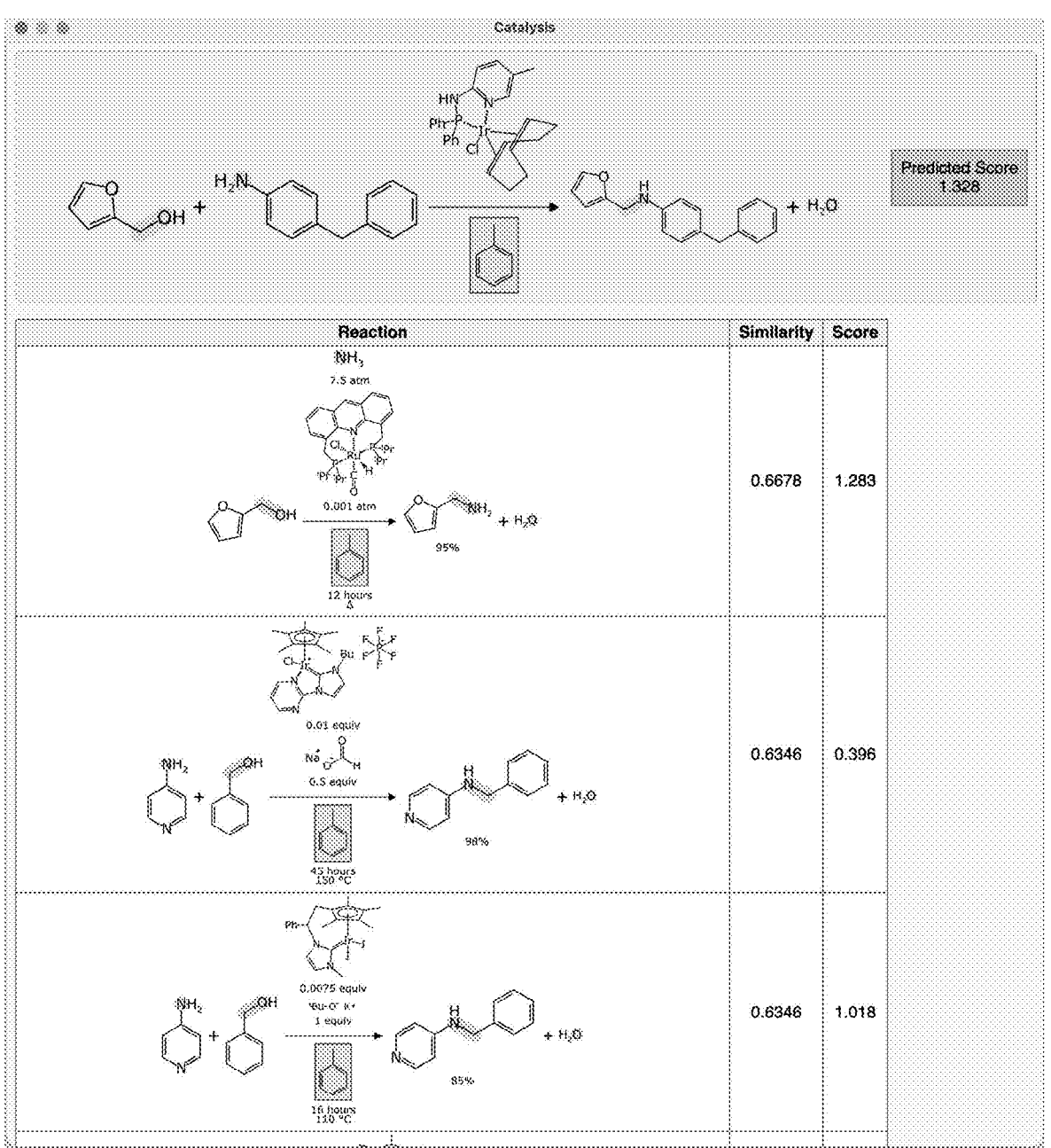
FIG. 2G shows a chemical reaction and a subset of the corresponding ranked series of proposed solvents, according to some embodiments.

Sixth, continuing through the set of proposed solvents and examining the evidence for each, it can be established that toluene is a good option (predicted score of 1.328, as opposed to the highest ranked solvent with a predicted score of 1.465). The evidence for this proposal is strong, as shown in FIG. 2G. Of the three most similar reaction schemes, two of the reactions have a non-ionic catalyst that is likely to have a similar solubility profile, and these two have a solvent score that is close to the prediction. Therefore, toluene is likely to be a good initial choice of solvent for the reaction, and the example reactions provide some options for selecting initial conditions, namely, reagents, catalyst concentration, time and temperature.

This example workflow demonstrates how the predictive functionality implemented by system 1600 can be used by a scientist user to design reaction conditions using the ranked recommendations made by machine learning, and a supportive user interface. Components of system 1600, including the training data, learning model, and user interface, function together synergistically.

Various embodiments of the invention have been described in detail. Since changes in and or additions to the above-described best mode may be made without departing from the nature, spirit or scope of the invention, the invention is not to be limited to those details but only by the appended claims.

What is claimed is:

1. A computer-implemented system for predicting reaction constituents, the system comprising:
   a reaction data generator configured to store reaction data for at least one reaction;
   a drawing generator configured to generate data representing a drawing of the at least one reaction based on the reaction data;
   a scoring engine configured to generate a catalyst efficacy score, a solvent efficacy score, or both based on the reaction data;
   a storage unit defining a graph convolutional model having at least one multilayer fully connected neural network, generated based on the reaction data and at least one of the catalyst efficacy score or the solvent efficacy score:
      wherein for a catalyst, at least one graph representation of the catalyst and at least one graph representation of at least one reactant and at least one product are inputs to the graph convolutional model; and
      wherein for a solvent, at least one graph representation of the solvent and at least one graph representation of at least one reactant, at least one product, and at least one reagent are inputs to the graph convolutional model;
   a prediction engine configured to:
      (a) predict an effectiveness of a specified catalyst or a specified solvent for a specified reaction;
      (b) predict at least one catalyst or at least one solvent from a first reaction for a second reaction based on the reaction data by determining whether the first reaction and the second reaction have an identical core transform; or
      both (a) and (b); and
   a model generator configured to generate a training set for and to train the graph convolutional model, the training set comprising:
      for the catalyst, a transform graph, a catalyst graph, and a catalyst efficacy score; and
      for the solvent, a transform graph, a reagents graph, a solvent graph, and a solvent efficacy score.

2. The computer-implemented system of claim 1, wherein the reaction data generator is configured to classify at least one constituent as a reactant, reagent, product, by-product, catalyst, solvent, or unknown.

3. The computer-implemented system of claim 1, wherein the reaction data generator is configured to convert multistep reaction data to data representing two or more single step reactions.

4. The computer-implemented system of claim 1, wherein the drawing generator is configured to generate the drawing of the reaction by assigning unique mapping numbers to each atom pair, each atom pair comprising a first atom on a first side of the reaction and a second atom on a second side of the reaction.

5. The computer-implemented system of claim 1, further comprising a mapping number generator configured to remove degeneracy in reaction data for the at least one reaction.

6. The computer-implemented system of claim 1, wherein the catalyst efficacy score is log(1+raw catalyst score), wherein $$\text{catalyst raw score} = \frac{Y \cdot e^{-T}}{t \cdot M}$$

25 where Y is percentage yield (multiplied by 0.01), T is temperature in ° C. (multiplied by 0.01), t is time (in hours) and M is molar fraction of catalyst (as a fraction of I equivalent of the limiting reactant).

7. The computer-implemented system of claim 1, wherein the solvent efficacy score is log(1+raw solvent score), wherein $$\text{raw solvent score} = \frac{Y \cdot e^{-T}}{t}.$$

8. The computer-implemented system of claim 1, the prediction engine configured to rank each of the catalysts or each of the solvents or both based on a corresponding efficacy score.

9. The computer-implemented system of claim 1, further comprising an interactive user interface device.

10. A computer-implemented method for predicting reaction constituents, the method comprising:

generating reaction data for at least one reaction;

generating data representing a drawing of the at least one reaction based on the reaction data;

generating a catalyst efficacy score, a solvent efficacy score, or both based on the reaction data;

storing a graph convolutional model having at least one multilayer fully connected neural network, generated based on the reaction data and at least one of the catalyst efficacy score or the solvent efficacy score:

wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and at least one reagent are inputs to the graph convolutional model; and predicting:

(a) an effectiveness of a specified catalyst or a specified solvent for a specified reaction;

(b) from a first reaction, at least one catalyst or at least one solvent for a second reaction based on the reaction data by determining whether the first reaction and the second reaction have an identical core transform; or both (a) and (b);

generating a training set for the graph convolutional model, the training set comprising:

for the catalyst, a transform graph, a catalyst graph, and a catalyst efficacy score; and for the solvent, a transform graph, a reagents graph, a solvent graph, and a solvent efficacy score; and training the graph convolutional model on the generated training set.

11. The computer-implemented method of claim 10, further comprising classifying at least one constituent as a reactant, reagent, product, by-product, catalyst, solvent, or unknown.

12. The computer-implemented method of claim 10, further comprising converting multistep reaction data to data representing two or more single step reactions.

13. The computer-implemented method of claim 10, further comprising generating the drawing of the reaction by assigning unique mapping numbers to each atom pair, each

26 atom pair comprising a first atom on a first side of the reaction and a second atom on a second side of the reaction.

14. The computer-implemented method of claim 10, further comprising removing degeneracy in reaction data for the at least one reaction.

15. The computer-implemented method of claim 10, wherein the catalyst efficacy score is log(1+raw catalyst score), wherein $$\text{catalyst raw score} = \frac{Y \cdot e^{-T}}{t \cdot M}$$

where Y is percentage yield (multiplied by 0.01), T is temperature in ° C. (multiplied by 0.01), t is time (in hours) and M is molar fraction of catalyst (as a fraction of I equivalent of the limiting reactant).

16. The computer-implemented method of claim 10, wherein the solvent efficacy score is log(1+raw solvent score), wherein $$\text{raw solvent score} = \frac{Y \cdot e^{-T}}{t}.$$

17. The computer-implemented method of claim 10, further comprising ranking each of the catalysts or each of the solvents or both based on a corresponding efficacy score.

18. A non-transitory computer readable medium storing a set of machine-interpretable instructions, which, when executed, cause a processor to perform a method for predicting reaction constituents, the method comprising:

generating reaction data for at least one reaction;

generating data representing a drawing of the at least one reaction based on the reaction data;

generating a catalyst efficacy score, a solvent efficacy score, or both based on the reaction data;

storing a graph convolutional model having at least one multilayer fully connected neural network, generated based on the reaction data and at least one of the catalyst efficacy score or the solvent efficacy score:

wherein for a catalyst, at least one graph representation of the catalyst and at least one graph representation of at least one reactant and at least one product are inputs to the graph convolutional model; and wherein for a solvent, at least one graph representation of the solvent and at least one graph representation of at least one reactant, at least one product, and at least one reagent are inputs to the graph convolutional model;

predicting:

(a) an effectiveness of a specified catalyst or a specified solvent for a specified reaction;

(b) from a first reaction, at least one catalyst or at least one solvent for a second reaction based on the reaction data by determining whether the first reaction and the second reaction have an identical core transform; or both (a) and (b);

generating a training set for the graph convolutional model, the training set comprising:

for the catalyst, a transform graph, a catalyst graph, and a catalyst efficacy score; and for the solvent, a transform graph, a reagents graph, a solvent graph, and a solvent efficacy score; and training the graph convolutional model on the generated
  training set.

<center>* * * * *</center>